(12) United States Patent
Tonouchi

(10) Patent No.: US 7,062,760 B2
(45) Date of Patent: Jun. 13, 2006

(54) SYSTEM AND METHOD FOR MEASURING SYNTAX COVERAGE PERCENTAGE

(75) Inventor: Toshio Tonouchi, Tokyo (JP)

(73) Assignee: NEC Corporation, Tokyo (JP)

( * ) Notice: Subject to any disclaimer, the term of this patent is extended or adjusted under 35 U.S.C. 154(b) by 1093 days.

(21) Appl. No.: 09/887,818

(22) Filed: Jun. 22, 2001

(65) Prior Publication Data

US 2004/0015910 A1   Jan. 22, 2004

(30) Foreign Application Priority Data

Jun. 23, 2000 (JP) .............................. 2000-189832

(51) Int. Cl.
    *G06F 9/45* (2006.01)
(52) U.S. Cl. .................... 717/143; 717/142; 706/47
(58) Field of Classification Search ........ 717/140–145, 717/154–157, 200; 706/45, 48
    See application file for complete search history.

(56) References Cited

U.S. PATENT DOCUMENTS

| | | | | |
|---|---|---|---|---|
| 5,586,330 A | * | 12/1996 | Knudsen et al. | 717/136 |
| 5,596,752 A | * | 1/1997 | Knudsen et al. | 717/117 |
| 5,682,535 A | * | 10/1997 | Knudsen | 717/117 |
| 5,737,608 A | * | 4/1998 | Van De Vanter | 717/112 |
| 5,812,840 A | * | 9/1998 | Shwartz | 707/4 |
| 5,857,212 A | * | 1/1999 | Van De Vanter | 715/519 |
| 6,016,393 A | * | 1/2000 | White et al. | 719/315 |
| 6,035,302 A | * | 3/2000 | Tonouchi | 707/102 |
| 6,138,112 A | * | 10/2000 | Slutz | 707/2 |
| 6,272,495 B1 | * | 8/2001 | Hetherington | 707/101 |
| 6,345,387 B1 | * | 2/2002 | Morrison | 717/170 |
| 6,581,052 B1 | * | 6/2003 | Slutz | 707/2 |
| 6,604,090 B1 | * | 8/2003 | Tackett et al. | 706/11 |
| 6,826,558 B1 | * | 11/2004 | Slutz | 707/2 |

FOREIGN PATENT DOCUMENTS

| | | |
|---|---|---|
| JP | 1-220044 | 9/1989 |
| JP | 3-75840 | 3/1991 |
| JP | 6-4350 | 1/1994 |
| JP | 6-214775 | 8/1994 |

(Continued)

OTHER PUBLICATIONS

Apte et al, "Automated learning of decision rules for text categorization", ACTM Trans. of Inf. System, vol. 12, No. 3, pp. 233-251, 1994.*

(Continued)

*Primary Examiner*—Anil Khatri
(74) *Attorney, Agent, or Firm*—Scully, Scott, Murphy & Presser, P.C.

(57) ABSTRACT

A syntax coverage percentage measuring system includes a BNF rule check table which has BNF data respectively corresponding to BNF syntax rules. A first file reading section reads each of test input files and carries out lexical analysis to data of each of the read test input files to classify into tokens. A first syntax analyzing section carries out syntax analysis to each of the tokens, and marks one of the BNF data of the BNF rule check table corresponding to the token. A coverage percentage output section acquires a total number of the BNF data and a number of the marked BNF data from the BNF rule check table, and calculates a coverage percentage based on the total number of the BNF (data and the number of the marked BNF data. An output section outputs the coverage percentage calculated by the coverage percentage output section.

28 Claims, 23 Drawing Sheets

FOREIGN PATENT DOCUMENTS

JP        10-49378        2/1998

OTHER PUBLICATIONS

Collins, "Three generative, lexicalised models for statistically parsing", ACM 8th Conf. on European Chapter of the Assoc. of Computational Lingustics, pp. 16-23, 1997.*

Forsberg et al, "Demonstration Abstract BNF converter", ACM Haskell, pp. 94-95, 2004.*

London et al, "A computer program for discovering and providing recognition rules for Backus Normal Form Grammars", ACM Press 19th Naitional Conf. pp. A1.3-1-A1.3-7, 1964.*

* cited by examiner

Fig. 9

```
(OMITTED)
/***** BNF GRAMMER RULE GROUP *****/
packages  ::=package1:e1 packages:e2
          |
          ;
package1  ::=PACKAGE packageName:e1 BEGIN
                attributeBody: e2
                actionBody: e3
                notificationBody:e4
             END
          ;
acttributeBody ::=ATTRIBUTES BEGIN
                    attributes:e
                  END
               |
               ;
acttributes ::=attribute:e1 SEMICOLON attributes:e2
            |
            ;
acttribute ::=attributeName:e1 type:e2 support:e3
           ;
```

Fig. 10

```
(OMITTED)
type  ::=NORMAL
      |   SHARED
      |   NEATTER neAttr:e
      ;

neAttr ::=BEGIN neInfs:e END
      ;

neInfis ::=packageptr SEMICOLON
           segment:e1 SEMICOLON
           offset:e3 SEMICOLON
           encodefunc:e4 SEMICOLON
           encodefunc:e5 SEMICOLON
      ;
```

Fig. 11

```
(OMTTED)
segment    ::=SEGMENT segNo:e ;
offset     ::=OFFSET address:e ;
size       ::=DATASIZE length:e   ;
encodeFunc ::=ENCODE funcName:e ;
decodeFunc ::=DECODE funcName:e ;
segNO      ::=integer:e  ;
length     ::=address:e  ;
           |  OPENPR integer:e CLOSER   ;
           ;
addess     ::=integer:e1 bit:e2  ;
bit        ::=OPENPR integer:e2 CLOSER
           |
           ;
```

Fig. 12

```
packages ::=
* package1 packages
   | *
   ;
package1 ::=
* PACKAGE   packageName BEGIN attributeBody
  actionBody notificationBody  END
  ;
attributeBody ::=
* ATTRIBUTES  BIGIN  attributes  END
  |
  ;
attributes ::=
* attribute SEMICOLON attributes
   | *
   ;
attribute ::=
* attributName   type suppout
   ;
```

Fig. 13

```
(OMITTED)
type ::=
* NORMAL
    | SHARED
    | * NEATTR neAttr
    ;
neAttr ::=
* BEGIN neInfos  END
    ;
neInfos ::=
* packageptr SEMICOLON segment SEMICOLON size
  SEMICOLON offset SEMICOLON encodeFunc  SEMICOLON
  decodeFunc SEMICOLON
    ;
```

Fig. 14

(OMTITTED)

```
segemnt ::=
* SEGMENT  seNo
  ;
offset ::=
* OFFSET  address
  ;
size ::=
* DATASIZE  length
  ;
encodeFunc ::=
* ENCODE  funcName
  ;
decodeFunc ::=
* DECODE funcName
  ;
segNo ::=
* integer
  ;
length ::=
* address
  | OPENPR  integer  CLOSEPR
  ;
addess ::=
* integer  bit
  ;
bit ::=
* OPENPR  integer  CLOSEPR
  |
  ;
coverage =34%
```

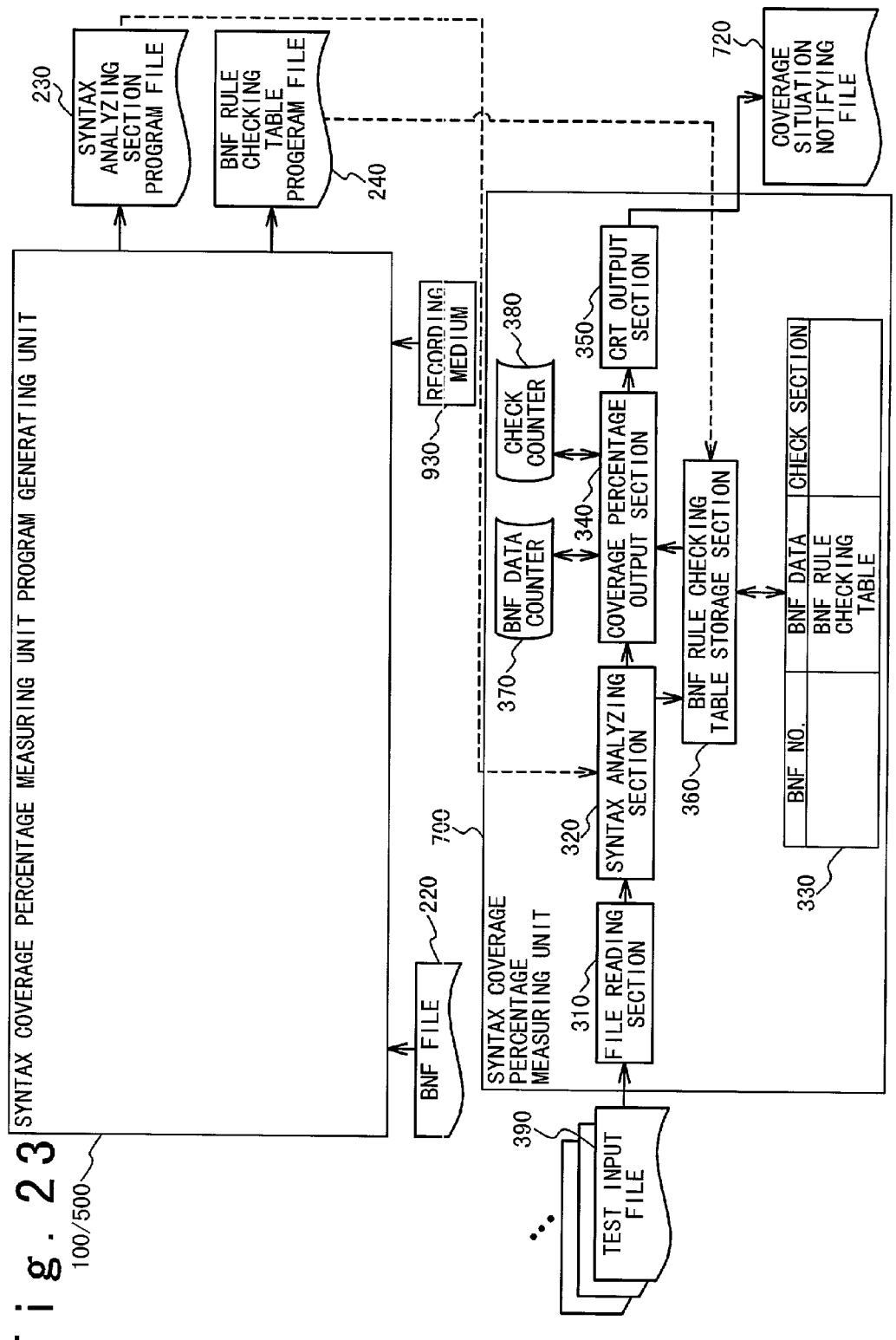

SYSTEM AND METHOD FOR MEASURING SYNTAX COVERAGE PERCENTAGE

BACKGROUND OF THE INVENTION

1. Field of the Invention

The present invention relates to testing technique of a language processing system which receives new language syntax. More particularly, the present invention relates to a syntax coverage percentage measuring system which is composed of a syntax coverage percentage measuring unit which is used for the measurement of a syntax coverage percentage of test data and a program generating unit provided for the syntax coverage percentage measuring unit and generating programs to realize the syntax coverage percentage measuring unit. Here, the test data is data of a test input file described in accordance to BNF (Backus Normal (Naur) Form) syntax rules, and the syntax coverage percentage is indicative of a rate of BNF syntax rules used in the test input file described in accordance to the BNF syntax to the whole BNF syntax rules.

2. Description of the Related Art

As the techniques about a conventional test data generating system and a conventional test program and data generating system, there are known, for example, a test data generation supporting apparatus disclosed in Japanese Laid Open Patent application (JP-A-Heisei 3-075840, a test program creation supporting apparatus disclosed in Japanese Laid Open Patent application (JP-A-Heisei 6-214775). Also, a language processing program verifying system is disclosed in Japanese Laid Open Patent application (JP-A-Heisei 1-220044). Below, these conventional techniques will be described.

(1) The Japanese Laid Open Patent Application (JP-A-Heisei 3-075840)

As shown in FIG. 1, in the conventional test data generating system, a syntax coverage percentage of an existing test source program used to test a language processing program shown in FIG. 1 is determined, and a source program using the syntax rules which are not used in the existing test source program is produced and replenished based on the determination result. Thus, a set of the test source programs is prepared to secure syntax coverage.

In this conventional technique, the syntax of each existing test source program is fixed, and a syntax coverage determining section measures a coverage percentage only to the predetermined syntax rules. Therefore, the syntax coverage determining section must be reformed because the test data is formed in accordance with new syntax, when the conventional language processing system is used for the new syntax.

(2) Japanese Laid Open Patent Application (JP-A-Heisei 6-214775)

As shown in FIG. 2, in the conventional test data generating system, a sentence pattern generating section automatically produces test data or a test program matching to BNF syntax rules described in a BNF file.

However, the test data matching to the BNF syntax rules exists infinitely. Therefore, even if a part of the test data is taken out, the possibility that significant test items are efficiently tested based on the test data part is low. Also, because the test data is automatically generated from the syntax rules in the conventional technique, what the generated test data is semantically related to is obscure to an operator. In other words, whether the test using the generated test data is enough is obscure to the operator. Moreover, in the conventional technique, the operator can concern the processing of the test data but the number of processes becomes enormous.

(3) Japanese Laid Open Patent Application (JP-A-Heisei 1-220044)

As shown in FIG. 3, in the conventional test program and data generating system, a TP automatic creating section inputs syntax and semantic description, and a generation rule selecting section randomly selects ones of the rules and produces a test program or a verification program.

In the conventional technique, by introducing the semantic description, significant test items can be generated. Generally, in case of the development of a language processing system, syntax rules are described such that a machine can read them but semantic description is carried out in native language in many cases. Therefore, to apply this conventional technique, the semantic description must be rewritten into a format which the machine can read. For this reason, a test process becomes necessary.

As mentioned above, the test data generating system/test program and data generating system are conventionally known.

However, when the operator is conscious of the test items to produces test data, and points out a portion of the syntax rules which is not covered by the test data, the test efficiency can be improved, compared with the conventional test data generating system/test program and data generating system. Especially, in the test for the development of a language processing system, a coverage percentage measurement based on the syntax rules is effective. The operator often sets test items for each of the syntax rules which are accepted by the language processing system as a test object. Therefore, untested test items can be easily estimated from the syntax rules which are not covered by the test data.

In the above mentioned conventional examples, when a new language is designed and the language processing system is tested, the syntax coverage percentage measuring unit or the syntax coverage percentage testing unit must be built newly, because the test data is produced in accordance with the new language syntax. Therefore, the more processes are necessary to develop a syntax coverage percentage measuring unit newly.

In conjunction with the above description, Japanese Laid Open Patent application (JP-A-Heisei 10-049378) is known. In this reference, a compiler developing apparatus converts a syntactic diagram drawn when a compiler is developed, into a BNF format syntax analysis generating system code and a lexical analysis generating system code. In this conventional technique, BNF is also used. However, the role or use purpose of the output BNF format syntax analyzing generating system codes is different from that of the present invention.

Also, a coverage percentage measuring system of software is disclosed in Japanese Laid Open Patent application (JP-A-Heisei 6-4350). In this reference, in a program developing apparatus (1), a branch ID notifying process is embedded in a coverage percentage measuring object program by a branch destination process detecting section (14), a branch ID producing section (15), a branch ID notifying process embedding section (16) and a measuring table producing section (17). Also, a coverage percentage measuring table (20) is produced. In a program executing unit (3), when the coverage percentage measuring object program is executed, a branch ID corresponding to each branch destination in the actual execution is transmitted to a coverage percentage measuring unit (5) via a transmission section (32). When receiving the branch ID, a branch ID recording section (53) or a branch result recording section (54) records the branch ID in a measuring table (57). A coverage percentage analyzing section (56) periodically refers to the measuring table (57) to analyze the coverage percentage, and the analysis result is printed or displayed on a printer or a display unit (52).

SUMMARY OF THE INVENTION

Therefore, an object of the present invention is to provide a syntax coverage percentage measuring system in which new syntax is accepted.

Another object of the present invention is to provide a syntax coverage percentage measuring system which includes a syntax coverage percentage measuring unit and a syntax coverage percentage measuring unit program generating unit.

Still another object of the present invention is to provide a syntax coverage percentage measuring system in which a program for a syntax coverage percentage measuring unit is automatically generated by a syntax coverage percentage measuring unit program generating unit.

Yet still another object of the present invention is to provide a syntax coverage percentage measuring system in which a new specification needs to be produced in addition to specification expression used for the development of a language processing system.

In an aspect of the present invention, a syntax coverage percentage measuring system includes a BNF rule check table which has BNF data respectively corresponding to BNF syntax rules. A first file reading section reads each of test input files and carries out lexical analysis to data of each of the read test input files to classify into tokens. A first syntax analyzing section carries out syntax analysis to each of the tokens, and marks one of the BNF data of the BNF rule check table corresponding to the token. A coverage percentage output section acquires the total number of the BNF data and the number of the marked BNF data from the BNF rule check table, and calculates a coverage percentage based on the total number of the BNF data and the number of the marked BNF data. An output section outputs the coverage percentage calculated by the coverage percentage output section.

Here, the output section may include a display unit, and the display unit displays the coverage percentage. Also, the coverage percentage output section may retrieve the marked BNF data. In this case, when the output section includes a display unit, the display unit displays the marked BNF data in addition to the coverage percentage.

Also, the output section may include a storage unit having a reporting file. In this case, the output section stores the coverage percentage in the reporting file. Also, the coverage percentage output section may retrieve the marked BNF data. In this case, when the output section includes a storage unit having a reporting file, the output section stores the marked BNF data in addition to the coverage percentage in the reporting file.

Also, the syntax analyzing section may operate based on a syntax analysis program which is generated based on a BNF file in which the BNF syntax rules are described. Also, the BNF rule check table may be generated based oil a BNF rule check table program which is generated based on a BNF file in which the BNF syntax rules are described.

In another aspect of the present invention, a syntax coverage percentage measuring system includes a syntax coverage percentage measuring unit program generating unit and a syntax coverage percentage measuring unit. The syntax coverage percentage measuring unit program generating unit generates a syntax analyzing section program and a BNF rule check table program from a BNF file in which BNF syntax rules are described. The syntax coverage percentage measuring unit reads the syntax analyzing section program and the BNF rule check table program generated by the syntax coverage percentage measuring unit program generating unit, tests data of each of test input files based on the syntax analyzing section program using the BNF rule check table program, and generates the syntax coverage percentage for each of the test input files based on a test result.

Here, the syntax coverage percentage measuring unit program generating unit may have a BNF rule database. In this case, the syntax coverage percentage measuring unit program generating unit reads the BNF file, carries out syntax analysis to the BNF rules of the BNF file to generate BNF data, stores the BNF data in the BNF rule database, and generates the syntax analyzing section program and the BNF rule check table program from the BNF data in the BNF rule database.

Also, the syntax coverage percentage measuring unit may test each of test input files based on the syntax analyzing section program using the BNF rule check table program, and output a coverage situation of the BNF syntax rules and the coverage percentage for the test input files based on the test result.

Also, the syntax coverage percentage measuring unit program generating unit may include a BNF rule database. A first file reading section reads the BNF file and classifies data of the BNF file into tokens, and a BNF syntax analyzing section carries out syntax analysis to each of the tokens to generate BNF data based on the BNF syntax rules, and stores the BNF data in the BNF rule database. A syntax analyzing section generating section generates the syntax analyzing section program from the BNF data stored in the BNF rule database. A BNF rule check table generating section generates the BNF rule check table program from the BNF data stored in the BNF rule database.

In this case, the syntax coverage percentage measuring system may further include a display unit, and a semantic test section carries out semantic analysis to the BNF data stored in the BNF rule database and controls the display unit to display an error message when a semantic discrepancy is found in the BNF data. Also, when each of the BNF data has a BNF rule number and a check section, the check section may be marked by the syntax coverage percentage measuring unit.

Also, the syntax coverage percentage measuring unit may include a BNF rule check table generated based on the BNF rule check table program and having the BNF data. A second file reading section reads each of test input files and carries out lexical analysis to data of each of the read test input files to classify into tokens. A syntax analyzing section carries out syntax analysis to each of the tokens, and marks one of the BNF data of the BNF rule check table corresponding to the token. A coverage percentage output section is generated based on the syntax analyzing section program, and acquires the total number of the BNF data and the number of the marked BNF data from the BNF rule check table, and calculates a coverage percentage based on the total number of the BNF data and the number of the marked BNF data. An output section outputs the coverage percentage calculated by the coverage percentage output section.

In this case, when the output section includes a display unit, the display unit may display the coverage percentage.

Also, the coverage percentage output section may retrieve the marked BNF data. When the output section includes a display unit, the display unit displays, the marked BNF data in addition to the coverage percentage.

Also, when the output section includes a storage unit having a reporting file, the output section may store the coverage percentage in the reporting file. Also, the coverage percentage output section may retrieve the marked BNF data. In this case, when the output section includes a storage unit having a reporting file, the output section may store the marked BNF data in addition to the coverage percentage in the reporting file.

Also, the syntax analyzing section may operate based on a syntax analysis program which is generated based on a BNF file in which the BNF syntax rules are described. Also, the BNF rule check table may be generated based on a BNF rule check table program which is generated based on a BNF file in which the BNF syntax rules are described.

In still another aspect of the present invention, a method of measuring a syntax coverage percentage is achieved by: reading each of test input files to carry out lexical analysis to data of each of the read test input files to classify into tokens; by carrying out syntax analysis to each of the tokens, to mark one of BNF data of a BNF rule check table corresponding to the token, the BNF rule check table having the BNF data respectively corresponding to BNF syntax rules; by acquiring the total number of the BNF data and the number of the marked BNF data from the BNF rule check table; by calculating a coverage percentage based on the total number of the BNF data and the number of the marked BNF data; and by outputting the coverage percentage calculated by the coverage percentage output section.

Also, in a yet still another aspect of the present invention, a method of measuring a syntax coverage percentage is achieved by generating a syntax analyzing section program and a BNF rule check table program from a BNF file in which BNF syntax rules are described; by reading the syntax analyzing section program and the BNF rule check table program generated by the syntax coverage percentage measuring unit program generating unit; by testing data of each of test input files based on the syntax analyzing section program using the BNF rule check table program; and by generating the syntax coverage percentage for each of the test input files based on a test result.

Here, the step of generating a syntax analyzing section program and a BNF rule check table program may be achieved by reading the BNF file and classifies data of the BNF file into tokens; by carrying out syntax analysis to each of the tokens to generate BNF data based on the BNF syntax rules, and stores the BNF data in a BNF rule database; by generating the syntax analyzing section program from the BNF data stored in the BNF rule database; by generating the BNF rule check table program from the BNF data stored in the BNF rule database.

Also, the method may further include: carrying out semantic analysis to the BNF data stored in the BNF rule database; and controlling a display unit to display an error message when a semantic discrepancy is found in the BNF data.

BRIEF DESCRIPTION OF THE DRAWINGS

FIG. 9 is a diagram showing a specific example of a BNF file in the syntax coverage percentage measuring unit program generating unit;

FIG. 10 is a diagram showing a specific example of the BNF file of the syntax coverage percentage measuring unit program generating unit;

FIG. 11 is a diagram showing a specific example of the BNF file of the syntax coverage percentage measuring unit program generating unit;

FIG. 12 is a diagram showing a specific example of the output of the syntax coverage percentage measuring unit;

FIG. 13 is a diagram showing a specific example of the output of the syntax coverage percentage measuring unit;

FIG. 14 is a diagram showing a specific example of the output of the syntax coverage percentage measuring unit;

FIG. 23 is a block diagram showing the structure of the syntax coverage percentage measuring system according to a sixth embodiment of the present invention.

DESCRIPTION OF THE PREFERRED EMBODIMENTS

Next, a syntax coverage percentage measuring system of the present invention will be described below in detail with reference to the attached drawings.

[The First Embodiment]

Figure 1:
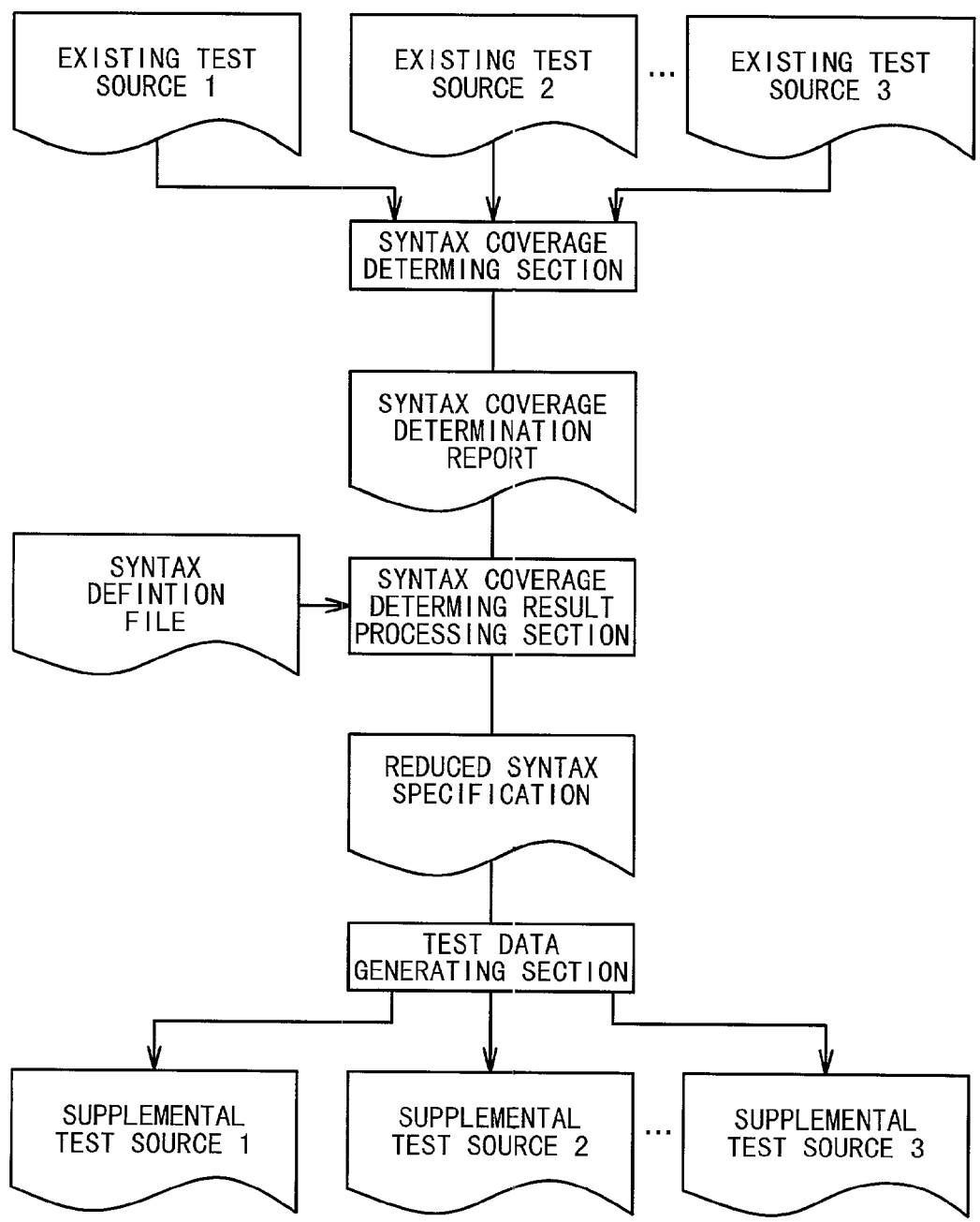
FIG. 1 is a block diagram showing the structure of a first conventional example.
Figure 2:
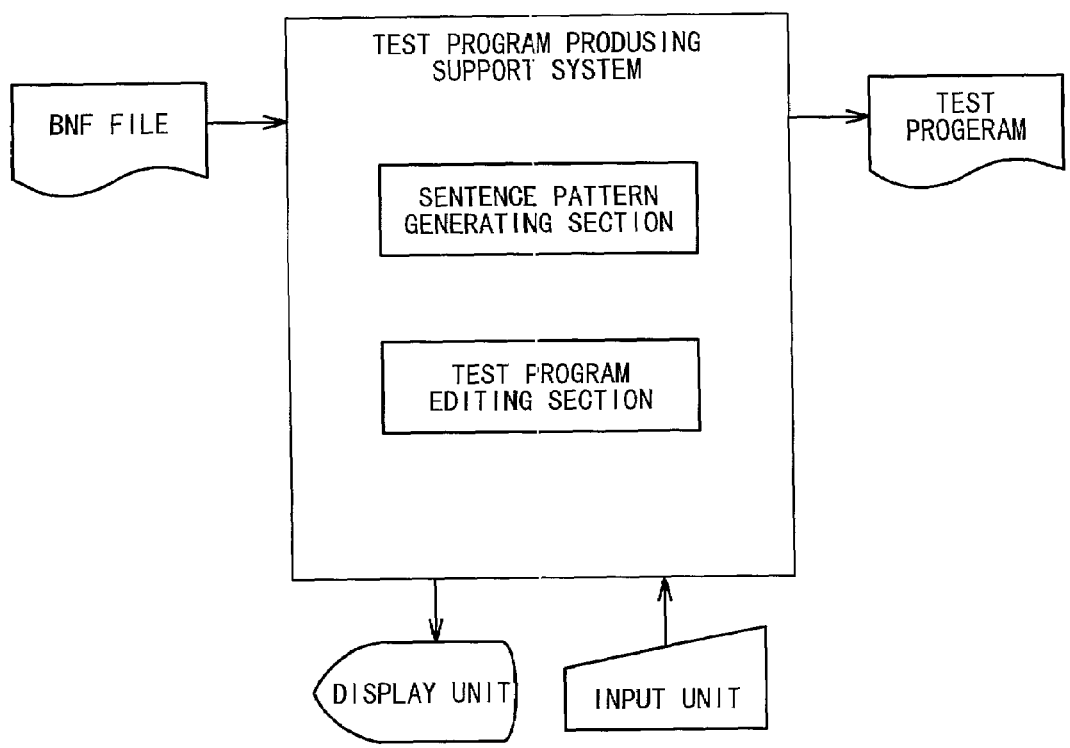
FIG. 2 is a block diagram showing the structure of a second conventional example.
Figure 3:
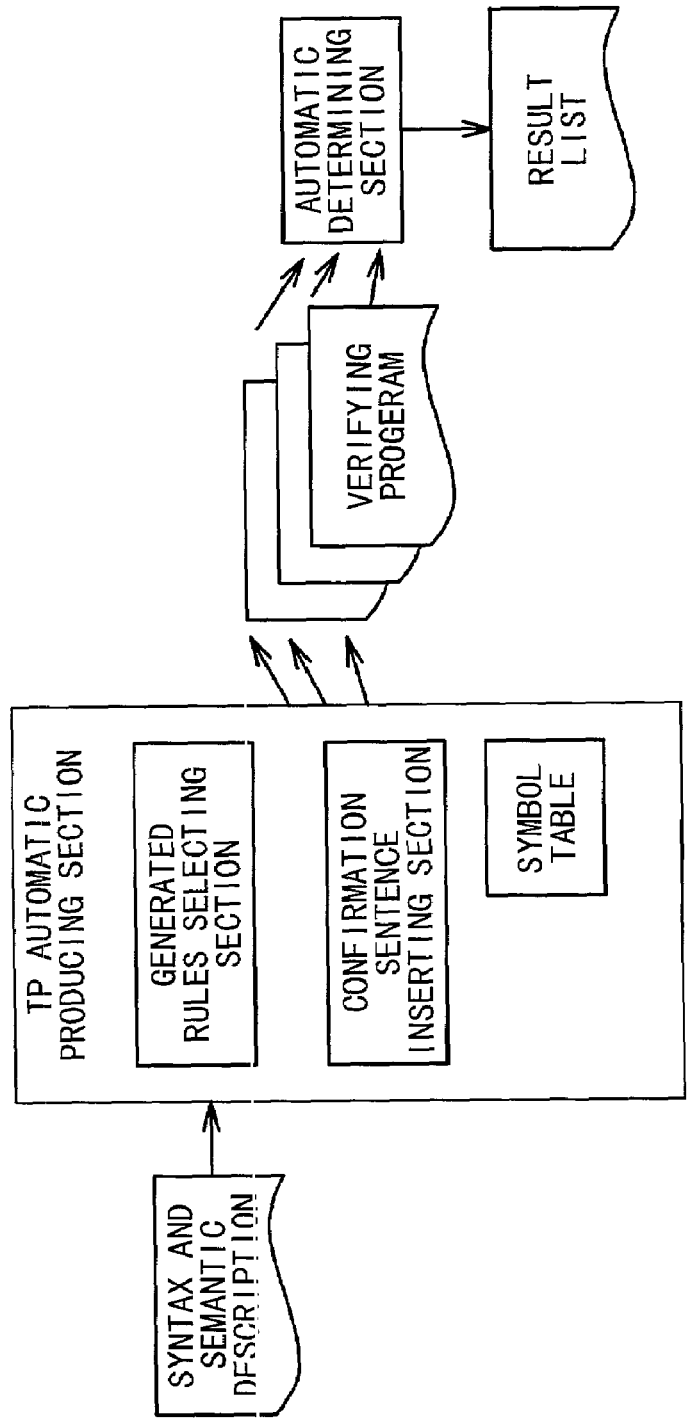
FIG. 3 is a block diagram showing the structure of a third conventional example.
Figure 4:
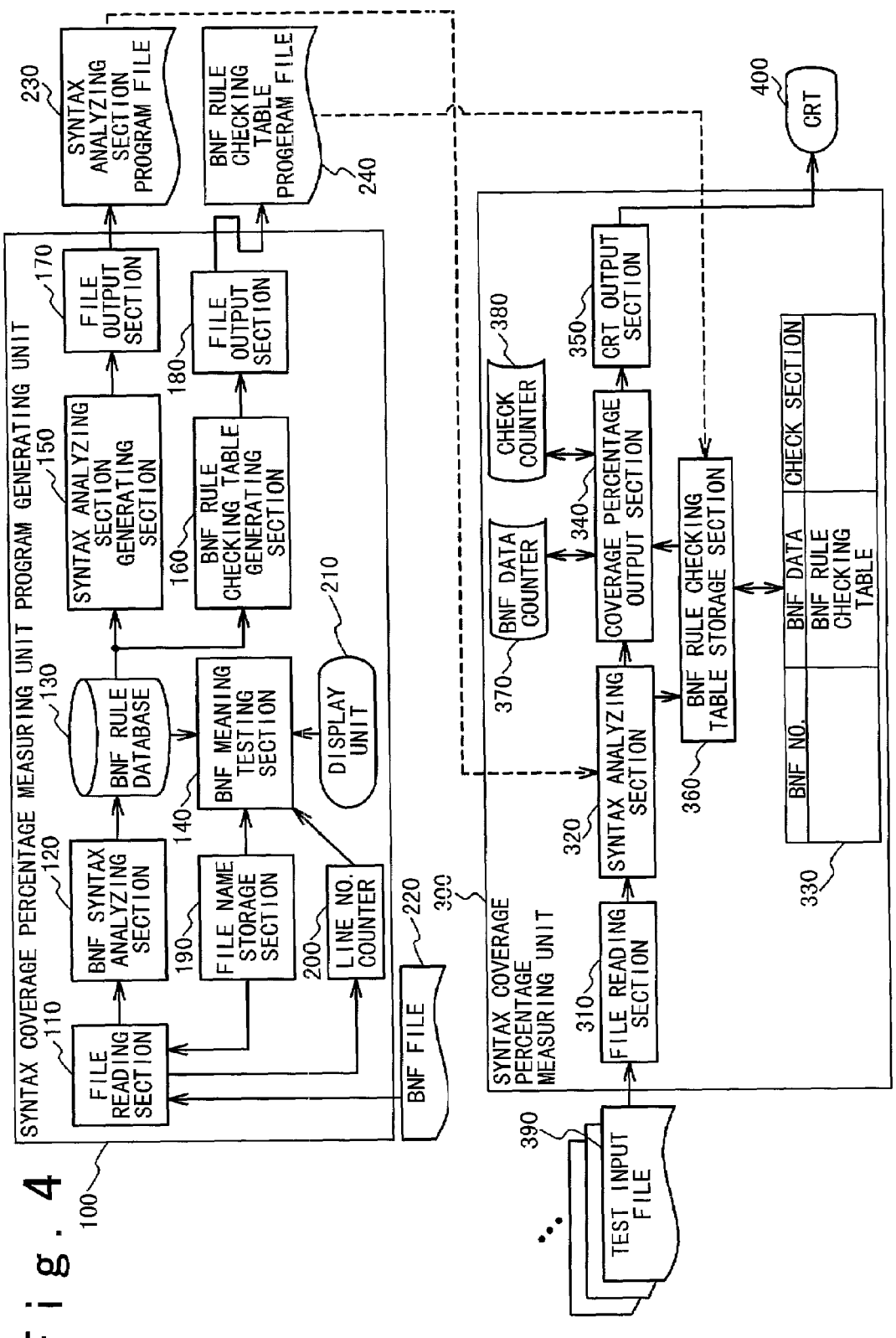
FIG. 4 is a block diagram showing the structure of a syntax coverage percentage measuring system according to a first embodiment of the present invention.

FIG. 4 is a block diagram showing the structure of the syntax coverage percentage measuring system according to the first embodiment of the present invention. Referring to FIG. 4, the syntax coverage percentage measuring system according to the first embodiment is composed of a syntax coverage percentage measuring unit program generating unit 100, a syntax coverage percentage measuring unit 300, a BNF file 220, a syntax analyzing section program file 230, a BNF rule check table program file 240, test input files 390 and a CRT 400.

The syntax coverage percentage measuring unit program generating unit 100 is composed of a file reading section 110, a BNF syntax analyzing section 120, a BNF rule database 130, a BNF semantic testing unit 140, a syntax analyzing section generating section 150, a BNF rule check table generating section 160, a file output section 170, a file output section 180, a file name storage section 190, a line number counter 200, and a display section 210.

The file reading section 110 reads the BNF file 220 and classifies the data of the BNF file 220 into words in units of tokens. It should be noted that the file reading section 110 counts a line number when reading the BNF file 220 and stores the counted line numbers in the line number counter 200.

The BNF syntax analyzing section 120 reads or receives the tokens which are classified by the file reading section 110, carries out syntax analysis to the tokens and generates BNF data having the data structures indicating the BNF syntax rules based on the BNF syntax rules.

The BNF rule database 130 stores the BNF data generated by the BNF syntax analyzing section 120, and the BNF data corresponds to the BNF syntax rules which are defined based on the BNF file 220.

The BNF semantic testing unit 140 accesses the BNF rule database 130, after the BNF data are generated by the BNF syntax analyzing section 120 with respect to all the BNF syntax rules and are accumulated in the BNF rule database 130.

The BNF semantic testing unit 140 accesses the BNF rule database 130 to acquire the BNF data and tests whether or not the BNF syntax rule is valid or right semantically. Also, when discovering a semantic discrepancy or fault with the BNF syntax rule, the BNF semantic testing unit 140 outputs an error message indicative of the discovery of the discrepancy and fault occurrence position data to the display section 210. Here, a file name corresponding to the fault occurrence position data can be acquired by referring to the file name storage section 190. Also, the line number corresponding to the fault occurrence position data can be acquired by referring to the line number counter 200. For example, in the BNF syntax rule, "segment::=SEGMENT:e segNo:e;", the same option "e" is used twice or more in the right side of the equation. This is ambiguous. Therefore the BNF semantic testing unit 14D generates the error message of "the same option "e" is used", and outputs to the display section 210 together with a file name indicated by the file name storage section 190 and a fault occurrence line number indicated by the line number counter 200.

The syntax analyzing section generating section 150 generates a syntax analyzing section program to realize the syntax analyzing section 320 in the syntax coverage percentage measuring unit 300.

The BNF rule check table generating section 160 generates a BNF rule check table program, i.e., a program which makes up the contents of the BNF rule check table 330 in the syntax coverage percentage measuring unit 300.

The file output section 170 outputs the syntax analyzing section program generated by the syntax analyzing section generating section 150 to the syntax analyzing section program file 230.

The file output section 180 outputs the BNF rule check table program generated by the BNF rule check table generating section 160 to the BNF rule check table program file 240.

The file name storage section 190 stores data for specifying the file name of the BNF file 220.

The line number counter 200 stores the line number for specifying the data of the BNF file 220 read by the file reading section 110.

The display section 210 informs a user of the discrepancy discovered by the BNF semantic testing unit 140 in the semantic.

The BNF file 220 is the BNF file for defining the language syntax rules inputted by the language processing system as the test object.

The syntax analyzing section program file 230 is a file for storing the syntax analyzing section program generated by the syntax analyzing section generating section 150. It should be noted that this syntax analyzing section program has two codes shown in the following items a and b for each of all the BNF syntax rules in the BNF file 220.

a) A BNF Syntax Rule

The BNF syntax rule in the BNF file 220 is output just as it is. For example, as for the BNF syntax rule, "segment::=SEGMENT segNo:e;", in the BNF file 220, this BNF syntax rule is output just as it is as "segment::=SEGMENT segNo:e;".

b) An Action Section

This describes an action when the syntax coverage percentage measuring unit 300 accepts an entry matching to the BNF syntax rule. The syntax analyzing section 320 in the syntax coverage percentage measuring unit 300 finds the entry matching to the BNF syntax rule from the BNF rule check table 330, and marks a corresponding entry of the BNF rule check table 330. A code to realize such a checking operation is an action section. It should be noted this check shows the coverage of the BNF syntax rule. For example, the action section to the BNF syntax rule, "segment::=SEGMENT segNo:e;", is a code for finding an entry matching to the BNF syntax rule "segment::=SEGMENT segNo:e;" from the BNF rule check table 330 and for marking the entry.

The BNF rule check table program file 240 is the file for storing the BNF rule check table program generated by the BNF rule check table generating section 160, that is, the program for making up the entry of the BNF rule check table 330 generated by accessing the BNF data in the BNF rule database 130 by the BNF rule check table generating section 160.

The syntax coverage percentage measuring unit 300 realized by the syntax coverage percentage measuring unit program generating unit 100 is composed of a file reading section 310, a syntax analyzing section 320, a BNF rule check table 330, a coverage percentage output section 340, a CRT output section 350, a BNF rule check table storage section 360, a BNF data counter 370, and a check counter 380.

The file reading section 310 analyzes several test input files 390 matching to the syntax rules defined in the BNF file 220 in a lexical to classify into the tokens. The lexical analysis to the test input file 390 by the file reading section 310 is the same as the lexical analysis by the language processing system as the test object. Therefore, the file reading section 310 can be easily built as follows. That is, to build a language processing system, the lexical analyzing unit generating unit such as Lex and JavaLex is used. A lexical analysis file is inputted to the lexical analysis unit generating unit. In the language processing system as the test object, it is supposed that the lexical analysis file and the lexical analysis unit generating unit are used and that the lexical analysis unit is being developed. In this case, the lexical analysis unit generating unit and the lexical analysis file for the language processing system as the test object are used in the syntax coverage percentage measuring unit 300, and the file reading section 310 can be easily built.

The syntax analyzing section 320 carries out the syntax analysis of the token classified by the lexical analysis by the file reading section 310, and marks a corresponding BNF data of the BNF rule check table 330 through the BNF rule check table storage section 360. It should be noted that the syntax analyzing section 320 operates by interpreting a program in syntax analyzing section program file 230 produced by the syntax coverage percentage measuring unit program generating unit 100.

The syntax analyzing section 320 receives the tokens from the file reading section 310 and carries out syntax analysis to them. As a result of this syntax analysis, it is possible to distinguish which of the BNF syntax rules defined in the BNF file 220 the token matches to. Then, the syntax analyzing section 320 requests the BNF rule check table storage section 360 to mark the entry of the BNF rule check table 330 corresponding to the matching BNF syntax rule.

The BNF rule check table 330 is a list of entries, each of which is composed of three columns as shown by the following items a to c, i.e., a BNF rule number, BNF data, a checking section, and manages the BNF data.

a) "BNF Number" Column

This is a column indicating an identification number uniquely given to the BNF data in order from one. The BNF rule check table 330 can be searched by use of data of this column as a key. The data of this column is filled by the BNF rule check table storage section 360.

b) "BNF Data" Column

This is a column to register the BNF data. The BNF rule check table 330 can be searched by use of data of this column as a key. The data of this column are filled by the BNF rule check table storage section 360.

c) "The Check Section" Column

This is a column marked when a test input data matching to the BNF syntax rule, i.e., data of the test input file 390 is inputted. At first, the columns of all entry do not have check. The syntax analyzing section 320 marks this column.

It should be noted that by specifying the BNF number in order from one, all the BNF data in the BNF rule check table 330 and all of the check contents can be gotten to the BNF rule check table 330.

The covering percentage output section 340 reads the check of the BNF rule check table 330 marked by the syntax analyzing section 320 and displays a coverage situation on the CRT 400 through the CRT output section 350. That is, the coverage percentage output section 340 specifies the BNF number, and acquires the BNF data and the check contents from the BNF rule check table 330 through the BNF rule check table storage section 360. Also, the coverage percentage output section 340 can output the BNF data acquired in this way to the CRT 400 through the CRT output section 350 as the BNF syntax rule as mentioned above. In this case, the coverage percentage output section 340 outputs the BNF syntax rule having the check in "the check section" column together with a mark.

Moreover, the coverage percentage output section 340 counts the total number of the BNF data and the number of BNF data with the check, calculates a coverage percentage based on the count when the processing ends and outputs the coverage percentage to the CRT 400 through the CRT output section 350.

The CRT output section 350 outputs a lexical outputted from the coverage percentage output section 340 to the CRT 400 in response to the request of the coverage percentage output section 340.

The BNF rule check table storage section 360 initializes the contents of the BNF rule check table 330 and carries out to read and write operation to the BNF rule check table 33C in according to the requests from the other modules.

It should be noted that the BNF rule check table storage section 360 carries out an initial setting of the BNF rule check table 330 in accordance with a program indicating the initial data of the BNF rule check table 330 in the BNF rule check table program file 230.

Also, the BNF rule check table storage section 360 looks for the BNF syntax rule specified by the syntax analyzing section 320 in "the BNF data" column of the BNF rule check table 330, and marks a corresponding entry of "the check section" column. Moreover, the BNF rule check table storage section 360 transfers the BNF data of the BNF rule check table 330 in accordance with the request of the coverage percentage output section 340 or gives whether or not "the check section" column of the BNF data has been checked.

The BNF data counter 370 is a memory area for the coverage percentage output section 340 to count the total number of BNF data.

The check counter 380 is a memory area for the coverage percentage output section 340 to count the number of BNF data that the check is marked in "the check section" column corresponding to the BNF data in the BNF rule check table 330.

Figure 5:
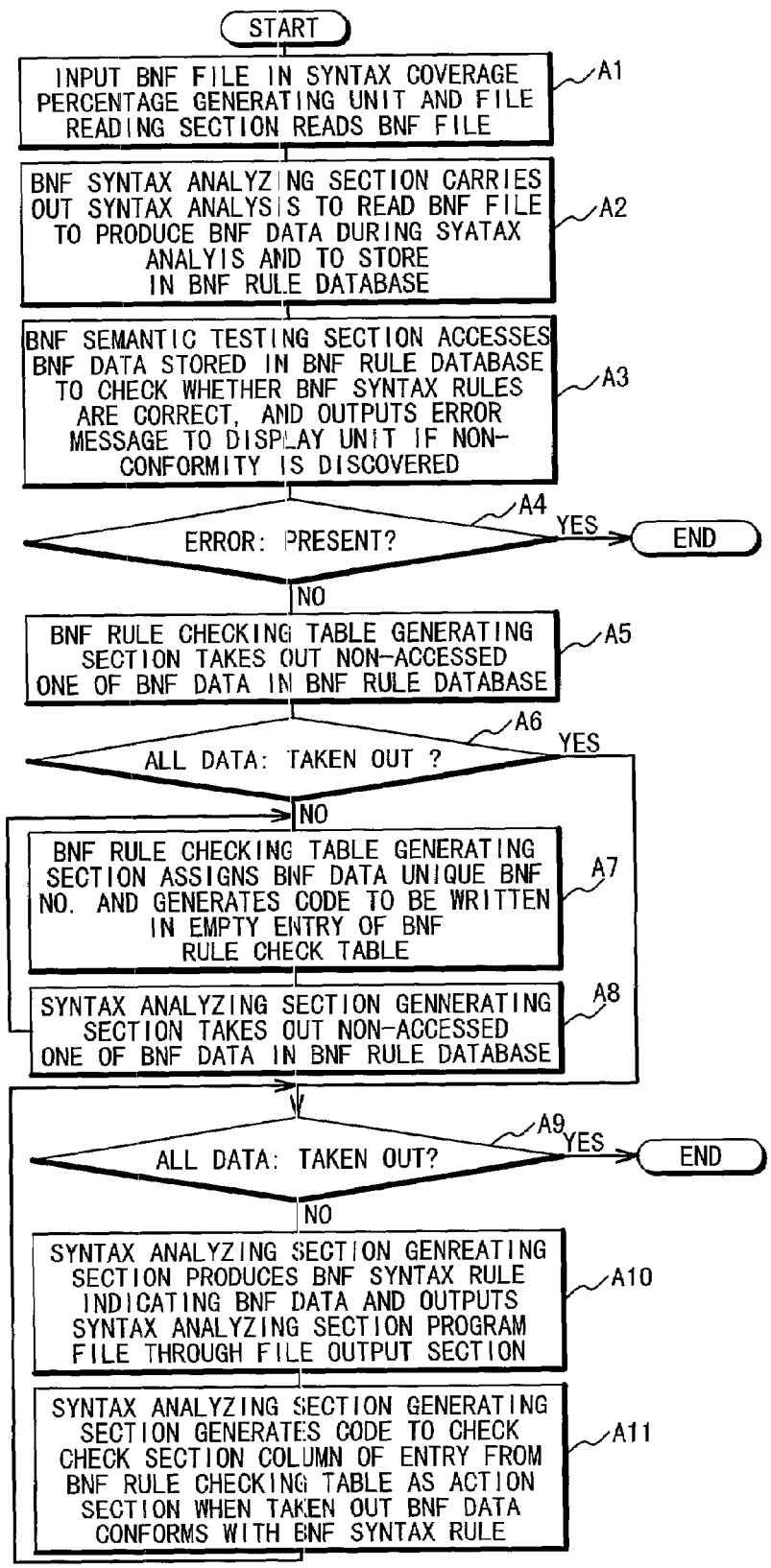
FIG. 5 is a flow chart showing the operation of a syntax coverage percentage measuring unit program generating unit shown in FIG. 4.

FIG. 5 is a flow chart showing the processing of the syntax coverage percentage measuring unit program generating unit 100 in FIG. 4. This processing is composed of a BNF file reading step A1, a BNF data producing step A2, a semantic testing step A3, an error existence or non-existence determining step A4, a BNF data taking-out step A5, a BNF data taking-out end determining step A6, a BNF rule check table program code generating step A7, a BNF data taking-out step A8, a BNF data taking-out end determining step A9, a BNF syntax rule producing and outputting step A10 and an action section generating step A11.

Figure 6:
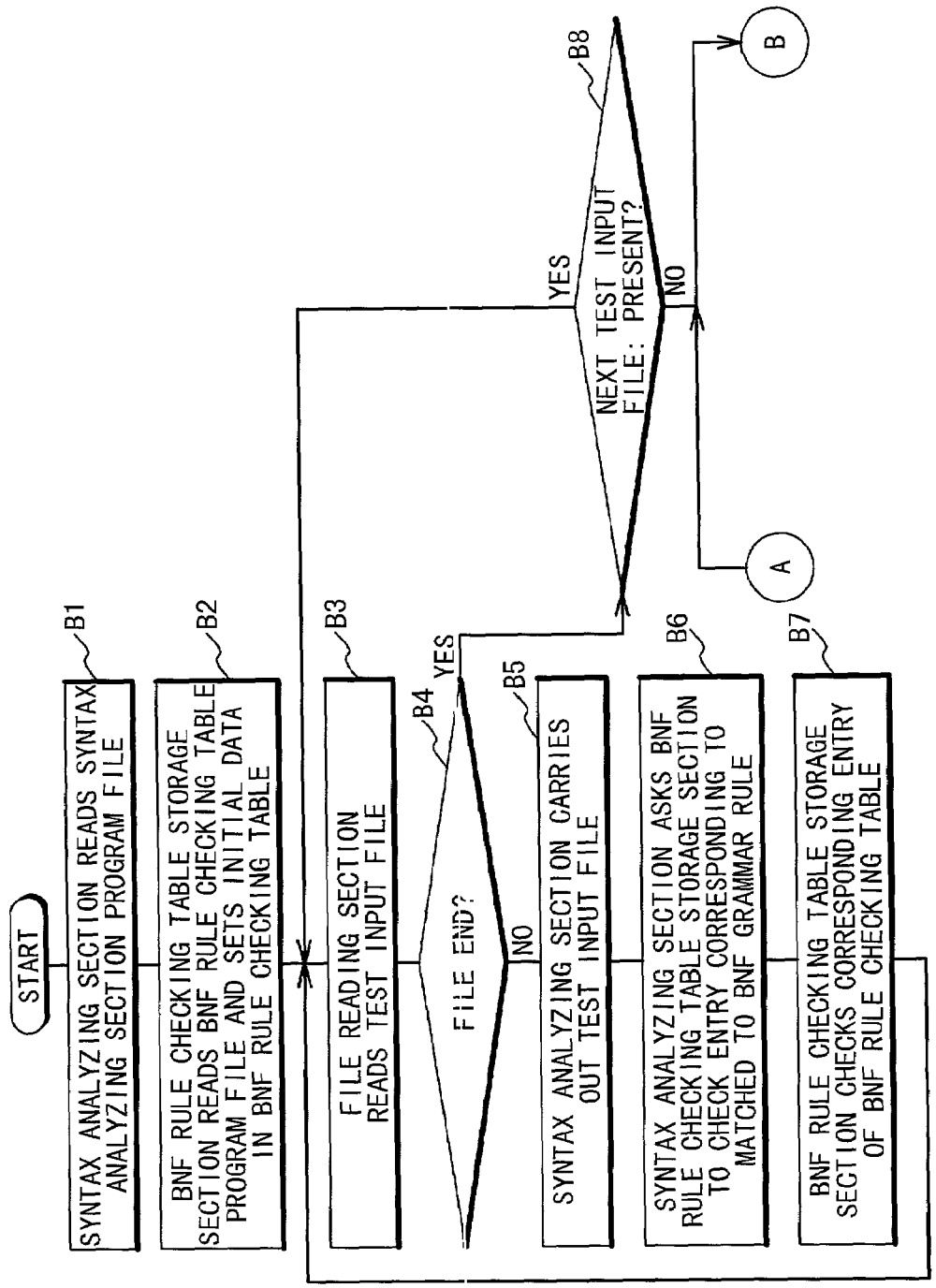
FIGS. 6 and 7 are a flow chart showing the process of the syntax coverage percentage measuring unit shown in FIG. 4.
Figure 7:
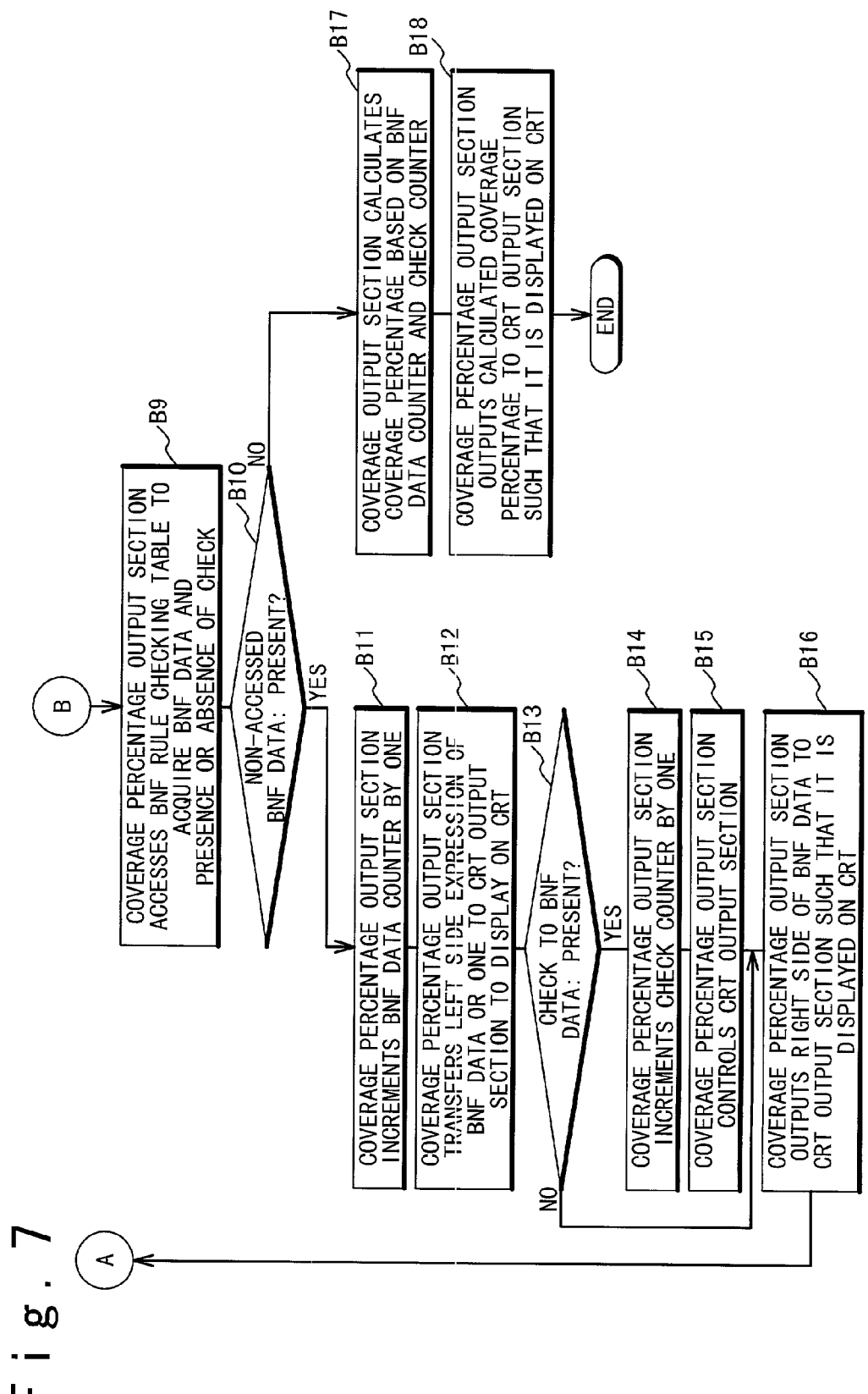

FIGS. 6 and 7 are a flow chart showing the processing of the syntax coverage percentage measuring unit 300 in FIG. 4. This processing is composed of a syntax analyzing section program file reading step B1, a BNF rule check table program file reading step B2, a test input file reading step B3, a file ending determining step B4, a test input file syntax analyzing step B5, a BNF rule check table checking request step B6, a BNF rule check table checking step B7, a next test input file existence determining step B8, a BNF rule check table access step B9, an un-accessing BNF data existence determining step B10, a BNF data counter increase step B11, a BNF data left side expression display step B12, a BNF data compatible checking existence or non-existence determining step B13, a check counter increase step B14, a checking display mark display step B15, a BNF data right side display step B16, a coverage percentage calculating step B17, and a coverage percentage display step B18.

Figure 8:
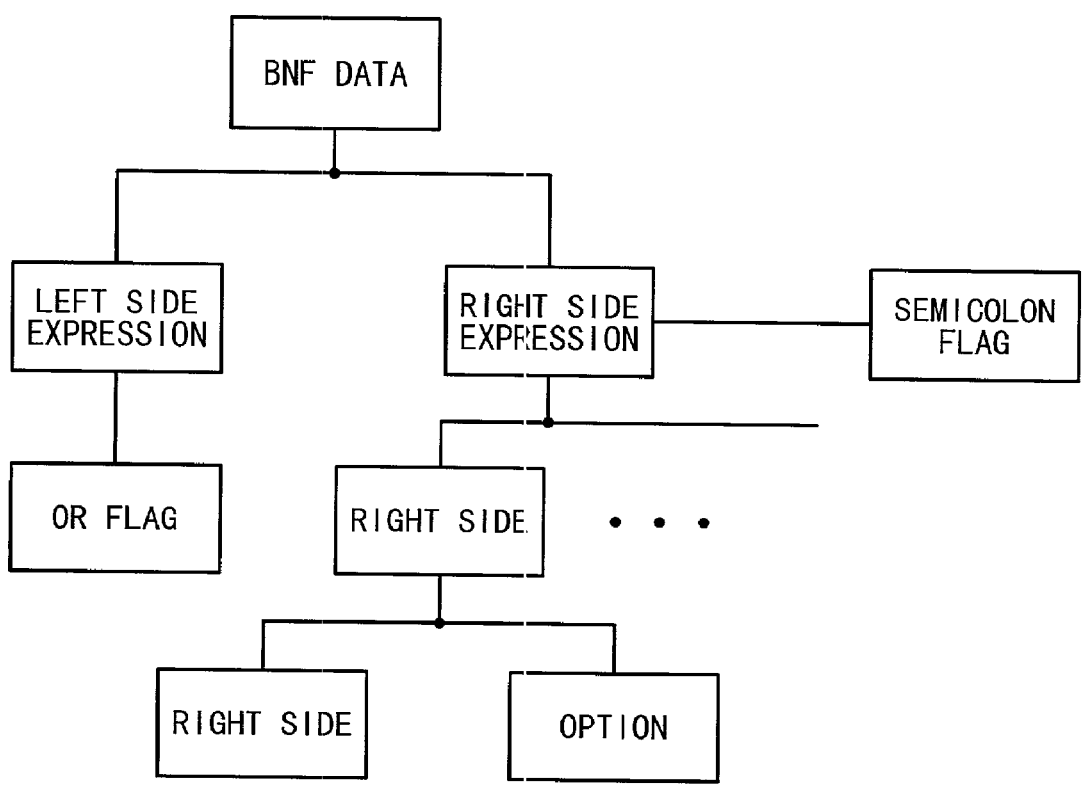
FIG. 8 is a diagram showing the structure of BNF data treated in the syntax coverage percentage measuring system of the present invention.

FIG. 8 is a diagram showing the data structure of the BNF data. As shown in FIG. 8, the BNF data is composed of a set of a left side expression and a right side equation. For example, in the BNF data indicating the BNF syntax rule "segment::=SEGMENT segNo:e;", "segment" is the left side expression and "SEGMENT segNo:e;" is the right side equation.

The right side equation includes equal to or more than 0 right side terms. For example, the right side equation of the previous example has two right side terms of "SEGMENT" and "segNo:e". Thus, the right side term "segNo:e" is composed of a set of a right side expression and an option. For example, in right side "segNo:e", "segNo" is a right side expression and "e" is an option. Here, the option is optional. For example, the right side term "SEGMENT" is composed only of a right side expression.

An OR flag and a semicolon flag are used when the BNF data is translated into a character string. When "|" is used instead of the left side expression in the original BNF syntax rule, the OR flag is set to be "true". Otherwise, the OR flag is set to be "false". Also, when the end of a sentence has ";" in the original BNF syntax rule, the semicolon flag is set to be "true". Otherwise, the semicolon flag is set to be "false". For example, the BNF syntax rule "bit ::=OPENPR integer CLOSEPR | ;" consists of two BNF syntax rules of "bit ::=OPENPR integer CLOSEPR" and "bit ::=". The OR flag and the semicolon flag in the former are both set to be "false" and the OR flag and the semicolon flag in the latter are both set to be "true".

FIGS. 9 to 11 are diagrams showing a specific instance of the BNF file 220. Here, one BNF file 220 is composed of all of the contents shown in FIGS. 9 to 11. As shown in FIGS. 9 to 11, the BNF file 220 is composed of a declaration section and a BNF syntax rule group.

The declaration section carries out "the setting necessary to interpret the BNF syntax rules" of a declaration of a non-terminal symbol (a non terminal sentence) and a declaration of a terminal symbol (a terminal sentence) used in the BNF syntax rules.

The BNF syntax rule group defines the syntax accepted by the language processing system as the test object. In this the BNF syntax rule group, the action section is defined. The action section specifies a program executed when the input data matching to the BNF syntax is accepted. However, the syntax coverage percentage measuring unit program generating unit 100 ignores the action section and interprets the BNF file 220.

The file reading section 110 classifies the contents of the BNF file 220 with a specified file name in the file name storage section 190 into words called tokens. For example, it is supposed that the BNF file 220 has the BNF syntax rule "segment::=SEGMENT segNo:e;". In this case, the file reading section 110 classifies this BNF syntax rule into the tokens, "segment", "::=", "SEGMENT", "segNo", ":", "e" and ";". It should be noted that the file reading section 110 does not consider as a token, the contents which does not requires any following process such as a comment, a blank and an empty line in the BNF file 220 and does not output any data to the following BNF syntax analyzing section 120.

Also, when the BNF syntax rule has an action section, the file reading section 110 does not output any data to the following BNF syntax analyzing section 120. For example, it is supposed that an operation that "when an entry matching to this syntax rules is supplied to the language processing system as the test object, a message of "SEgment no=" and a segment number are displayed on a screen is defined in the action section, as "segment::=SEGMENT segNo:e {:System.out.println("Segment no="+e); :};". In this case, the action section in the above-mentioned example is a portion surrounded by "{:"and ":}". This action section is not related with the syntax coverage percentage measuring unit program generating unit 100. Therefore, the file reading section 110 transfers only the tokens "segment", "::=", "SEGMENT", "segNo", ":", "e" and ";" of the syntax rules to the BNF the syntax analyzing section 120, and ignores the action section.

FIGS. 12 to 14 are diagrams showing a specific example of the output of the syntax coverage percentage measuring unit 300. One output example of the syntax coverage percentage measuring unit is composed of all of the contents shown in FIGS. 12 to 14.

Next, an operation of the whole syntax coverage percentage measuring system according to this embodiment will be described below in detail with reference to FIGS. 4 to 14.

The whole operation of the syntax coverage percentage measuring unit program generating unit 100 in the syntax coverage percentage measuring system in accordance with this embodiment will be first described in detail.

The file reading section 110 in the syntax coverage percentage measuring unit program generating unit 100 inputs the BNF file 220 to the syntax coverage percentage measuring unit program generating unit 100, and reads the BNF file 220 and classifies the BNF data into tokens in accordance with the BNF syntax rules (the step A1 of FIG. 5). For example, when inputting the BNF syntax rule "packages ::=package1:e1 packages:e2|;", the file reading section 110 classifies into the tokens, "packages", "::=", "package1", ":", "e1", "packages", ":", "e2" and ";".

The BNF syntax analyzing section 120 receives the tokens generated at the step A1, carries out the syntax analysis of the BNF file 220 and generates the BNF data showing the BNF syntax rules (Step A2). In case of the previous example, the BNF data indicating two BNF syntax rules "packages package1:e1 packages:e2" and "packages::=;" is generated. These BNF syntax rules form the BNF data having the structure as shown in FIG. 8. For example, the BNF data indicating the first BNF syntax rule in the above example is composed of a left side expression of "packages" and two right side terms of "package1:e1" and "packages:e2". In this case, because the left side expression of the BNF syntax rule is not described using "|", the OR flag is set to be "false". Moreover, the right side term of "package1:e1" and "packages:e2" can be classified into the right side expression and the option. Also, because there is not ";" in the end of the right side of this the BNF syntax rule, the semicolon flag is set to be "false". Moreover, for example, the BNF data indicating the second BNF syntax rule in the above example is composed of a left side expression of "packages" and no right side term. In this case, because the left side expression of the BNF syntax rule is described using "|" instead of "packages", the OR flag is set to be "true". Also, because the end of the right side of the BNF syntax rule has ";", the semicolon flag is set to be "true".

The BNF the syntax analyzing section 120 accumulates or stores the BNF data in the BNF rule database 130 every time the BNF data is generated as described above (Step A2).

For example, with the first BNF syntax rules of a group in the previous example, the BNF syntax rule, "packages : package1:e1 packages:e2" is converted into the BNF data and the BNF data is accumulated in the BNF rule database 130. Next, the second BNF syntax rule "packages::=;" is converted into the BNF data and the BNF data is accumulated in the BNF rule database 130. Moreover, for example, as shown in FIG. 9, the BNF syntax rule, "package1::=PACKAGE packageName:e1 BEGIN attributeBody:e2 actionBody:e3 notificationBody:e4 END;" follows the above example in the BNF file 220, the BNF syntax rule is converted into the BNF data and the BNF data is accumulated in the BNF rule database 130.

The BNF semantic testing unit 140 accesses the BNF data stored in the BNF rule database 130. By this, whether or not each of the BNF syntax rules in the BNF file 220 is right semantically is tested (Step A3). For example, it is necessary to declare that the left side expression in the BNF syntax rule is a non-terminal symbol previously. Therefore, if there is a left side expression described without any declaration, the BNF syntax rule has a semantic error or semantic discrepancy.

When finding such an error, the BNF semantic testing unit 140 outputs or displays an appropriate error message on the display section 210 (Step A3). An error occurrence position is specified and the above-mentioned display can be carried out by referring to the file name storage section 190 for an error file name and by referring to the line number counter 200 for the error line number.

When the semantic test is ended at the step A3, the BNF semantic testing unit 140 determines whether or not one or more semantic discrepancies are discovered or whether any error exists or not (Step A4). When there is an error, i.e., when "the BNF file 220" is determined "not to be right semantically" at the step A4, the syntax coverage percentage measuring unit program generating unit 100 stops the operation (the processing is ended).

On the other hand, when the semantic test by the BNF semantic testing unit 140 ends at the step A4, and it is determined to be proved that all the BNF syntax rules in the BNF file 220 are semantically right or there is no error, the BNF rule check table generating section 160 accesses the BNF data of the BNF rule database 130. Then, the BNF rule check table generating section 160 generates the BNF rule check table program to realize; the BNF rule check table 330, as shown by the following items a to c.

a) In an arbitrary order, the BNF data is taken out from the BNF rule database 130 (Step A5).
b) A BNF number is assigned to the taken out BNF data the in the order. A code in the BNF rule check table program is generated to insert the BNF number and the BNF data in the BNF rule check table 330 (Step A7). In this case, the code :Ls generated to maintain "the check section" column in a blank state.
c) The above-mentioned :series of operation is repeated (step A5 and step A7) until each of all the BNF data in the BNF rule database 130 is taken out once (Step A6).

Subsequently, the syntax analyzing section generating section 150 generates the syntax analyzing section program to realize the syntax analyzing section 320 in the following steps a to d as shown below.

a) In an arbitrary order, the BNF data is taken out from the BNF rule database 130 (Step A8).
b) The BNF syntax rule shown by the BNF data taken out at the step A8 is generated and outputted to the syntax analyzing section program (Step A10).
c) The code is generated and outputted as the action section of the BNF syntax rule to show the program executed when the syntax coverage percentage measuring unit 300 accepts the input data matching to the BNF syntax rule shown by the BNF data taken out at the step A8 (Step A11). The code of the action section is used to mark "the check section" column of the entry corresponding to the BNF syntax rule in the BNF rule check table 330.
d) The above-mentioned series of operation (step A8, step A10 and step A11) is repeated until each of all the BNF data in the BNF rule database 130 is taken out once (Step A9).

Second, the whole operation of the syntax coverage percentage measuring unit 300 based on the program generated by the syntax coverage percentage measuring unit program generating unit 100 in the syntax coverage percentage measuring system in accordance with this embodiment will be described in detail.

First, an initial setting (step B1 and step B2 of FIGS. 6 and 7) is carried out as shown by the following items a and b.
a) The syntax analyzing section 320 of the syntax coverage percentage measuring unit 300 reads the syntax analyzing section program file 230 to acquire the syntax analyzing section program which has the BNF syntax rules showing the syntax of the test input file 390 and the action section showing the program executed when accepting the input data matching to the BNF syntax rule (Step B1). The syntax analyzing section 320 carries out the syntax analysis in accordance with the syntax analysis procedure of the test input file 390 through the reading operation.
b) The BNF rule check table storage section 360 reads the BNF rule check table program file 240 and sets the initial data of the BNF rule check table 330 (Step B2). Thus, the BNF data showing all the BNF syntax rules in the BNF file 220 is stored in the BNF rule check table 330. At this time, "the check section" column of each entry of the BNF rule check table 330 is empty. After the above initial setting ends, the file reading section 310 reads data of each test input file 390 until the reading of the test input file 390 ends, i.e., until "the file end" is determined at the step B4 (Step B3).

The file reading section 310 carries out the lexical analysis of the data read at the step B3 and classifies the data in the test input file 390 into the tokens, and then outputs to the following syntax analyzing section 320. When determining "not file end" at the step B4, the file reading section 310 transfers the control to the processing of the step B5 by the syntax analyzing section 320.

The syntax analyzing section 320 carries out the syntax analysis of the data of the test input file 390 transferred from the file reading section 310 in accordance with the contents of the syntax analyzing section program file 230 (Step B5). In the syntax analysis of the step B5, the syntax analyzing section 320 requests the BNF rule check table storage section 360 to mark "the check section" column of an entry of the BNF rule check table 330 corresponding to "the matched or adaptable BNF syntax rule" (Step B6).

The BNF rule check table storage section 360 marks "the check section" column of the corresponding entry in the BNF rule check table 330 based on the request of step B6 (Step B7). When the processing of the step B7 ends, the processing of the step B3 is executed and the processing of the above-mentioned steps B3 to step B7 is repeated.

It should be noted that when the file reading section 310 reads all the data of the test input file 390, i.e., when "the file end" is determined at the step B4, the control flow advances to the step B8. At the step B8, the file reading section 310 checks whether or not another test input file 390 exists. When it is determined at the step B8 that "the other test input file 390 exists", the file reading section 310 repeats the processing from the step B3 to a new test input file 390. On the other hand, when it is determined at the step B8 that "the other test input file 390 does not exist", the file reading section 310 transfers the control to the coverage percentage output section 340.

The covering percentage output section 340 outputs data indicative of a coverage situation through the processing of a step B9 and subsequent steps shown in the following items a to i.

a) The BNF rule check table storage section 360 accesses the BNF rule check table 330 from one in order based on the BNF number and acquires the BNF data and the existence or non-existence of the check (Step B9).
b) Next, it is determined whether or not the BNF data not accessed in the processing of the step B9 immediately before is left, i.e., whether all the BNF data is accessed (Step B10).
c) When it is determined at the step B10 that "the BNF data not accessed is left and is possible to be accessed at the step B9", the control flow advances to a step B11 so that the BNF data counter 370 is increased by one. Through the increase of the value of the BNF data counter 370, the total number of BNF data can be counted.
d) When the OR flag of the BNF data obtained in the step B9 is "false", the left side expression of the BNF data is displayed on the CRT 400 through the CRT output section 350 (Step B12). Also, when the OR flag is "true", "|" is displayed on the CRT 400 through the CRT output section 350 (Step B12).
e) It is checked whether there is a check in "the check section" column in the entry corresponding to the BNF data obtained in step B9 (Step B13).
f) When it is determined at the step B13 that "there is a check for the BNF data", the check counter 380 is increased by one (Step B14). Through the increase of the value of the check counter 380, the number of BNF data with the check is counted. Here, "the BNF syntax rule shown by the BNF data with the check" means the BNF syntax rule covered by the test input data 390.
g) Moreover, a mark or symbol is displayed on the CRT 400 through the CRT output section 350 to show the check at the side of the BNF syntax rule shown by the BNF data which has been determined at the step B13 to have "a check" (Step B15). The mark shows to the operator that the BNF syntax rule is covered. For example, the BNF syntax rules having "*" are "covered BNF syntax rules" in output examples of the syntax coverage percentage measuring unit shown in FIGS. 12 to 14.
h) When it is determined at the step B13 that "there is not a check for the BNF data" or when the processing of the step B15 is completed, the right side of the BNF data is converted into a lexical, is transferred to the CRT output section 350 and is displayed on the CRT 400 (Step B16). If the mark or symbol is outputted to show the check, the mark or symbol is displayed at the step B16 to be arranged at the side of the lexical.
i) After the processing of step B16 is completed, the control flow returns to the step B9 and the step B9 and the subsequent steps are repeated.

On the other hand, when it is determined at the step B10 that "all the BNF data have been accessed", the coverage percentage output section 340 carries out a calculating process of the coverage percentage and a display process shown in the following a and b.
a) The coverage percentage is calculated based on the value of the BNF data counter 370 and the value of the check counter 380 (Step B17). That is, the coverage percentage is calculated by dividing the value of the check counter 380 by the value of the BNF data counter 370.
b) The coverage percentage calculated at the step B17 is displayed on the CRT 400 through the CRT output section 350 (Step B18).

Through the above processes, the operation of the syntax coverage percentage measuring unit 300 is ended.

Third, using a specific example, the operation of the syntax coverage percentage measuring unit program generating unit 100 will be described. It should be noted that in this example, the language syntax inputted to the language processing system as the test object is shown in the BNF file, "sample.bnf", 220 as shown in FIGS. 9 to 11. Here, FIG. 15 is a diagram showing the specific example of the BNF data generated at the syntax coverage percentage measuring unit program generating unit 100.

The syntax coverage percentage measuring unit program generating unit 100 inputs the BNF file 220. It should be noted that the file name "sample.bnf" of the BNF file 220 is previously stored in the file name storage section 190. Also, the value of line number counter 200 is initialized to 0.

The file reading section 110 analyzes the BNF file 220 in lexical to divide into the tokens (The step A1 of FIG. 5). For example, when the BNF syntax rule "bit ::=OPENPR integer CLOSEPR | ;" in the BNF file 220 of FIGS. 9 to 11 is analyzed in lexical, the tokens "bit", "::=", "OPENPR", "integer", "CLOSEPR", "|" and ";" are obtained. Every time one line of the BNF files 220 is read, the file reading section 110 adds the value of line number counter 200 by one.

Figure 15:
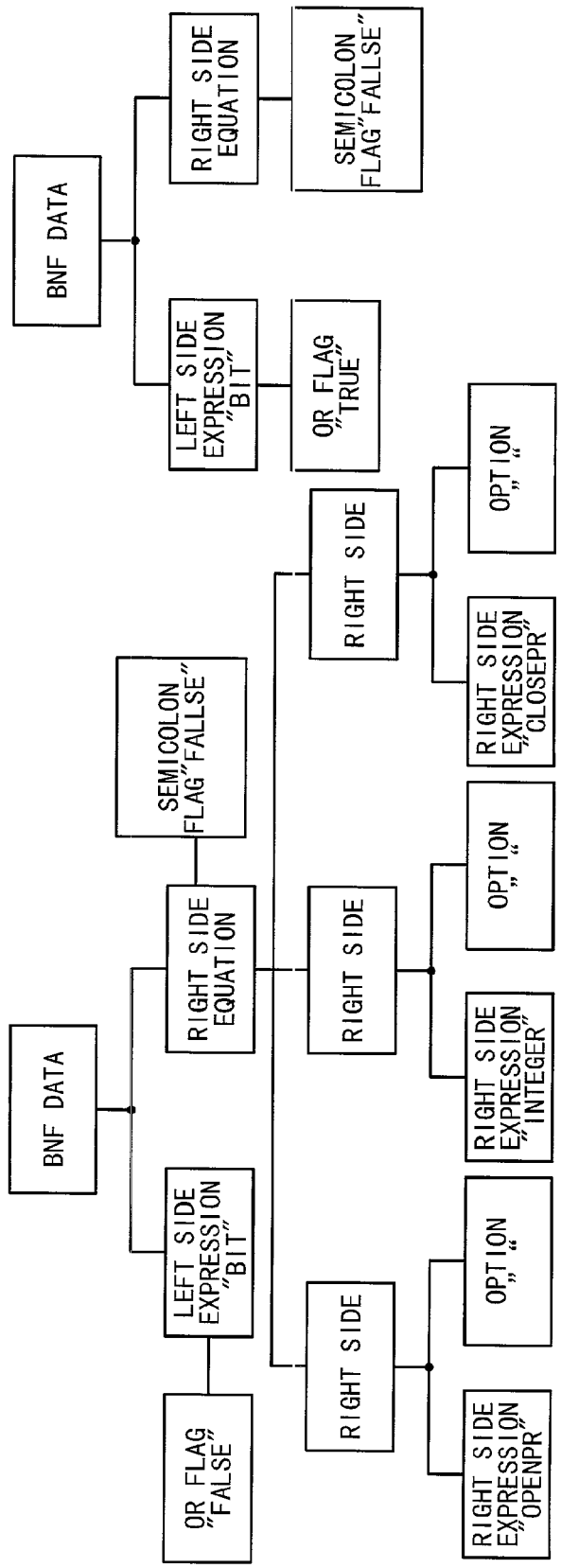
FIG. 15 is a diagram showing a specific example of the BNF data.

The BNF syntax analyzing section 120 carries out the syntax analysis to these tokens and generates the BNF data shown in FIG. 15 (Step A2). In case of the above example, because two BNF syntax rules exist such as "bit ::=OPENPR integer CLOSEPR" and "bit ::=", two BNF data are obtained as shown in FIG. 15. The BNF syntax analyzing section 120 stores two of these BNF data in the BNF rule database 130 (Step A2).

When the syntax analysis ends to all the tokens, the BNF semantic testing unit 140 tests whether or not each of the BNF data stored in the BNF rule database 130 is semantically correct (Step A3). For example, the BNF semantic testing unit 140 tests whether or not the token "bit" is defined as a non-terminate symbol. In this case, because the token is defined as "non terminal . . . bit . . . ;" in the BNF file 220 with the file name, "sample.bnf", it is determined not to be a semantic error".

When the semantic test ends to all the BNF data, the BNF rule check table generating section 160 generates a code to fill the BNF rule check table 330 (Step A5-step A7). Here, the BNF rule check table generating section 160 takes out all the BNF data from the BNF rule database 130 in the same order as the BNF the syntax analyzing section 120 has stored the BNF data in the BNF rule database 130. For example, it is supposed that the BNF rule check table generating section 160 has handled the BNF data "bit ::=OPENPR integer CLOSEPR" as the n-th data (n is a positive integer). In this case, the BNF rule check table generating section 160 generates the code to register (n, bit ::=OPENPR integer CLOSEPR, " ") as a set of the BNF number, the BNF data, and the check section on the BNF rule check table 330. The check section of " " indicates a blank. Then the BNF rule check table generating section 160 outputs the code to the BNF rule check table program file 240 through the file output section 180. Also, as for the BNF data "bit ::=;", the BNF rule check table generating section 160 generates (n+1, bit ::=, " ") as the code to register on the BNF rule check table 330, and outputs the generated code to the BNF rule check table program file 240 through the file output section 180.

When the BNF rule check table generating section 160 has generated the codes to all the BNF data to fill the BNF rule check table 330, the syntax analyzing section generating section 150 generates a program in the syntax analyzing section program file 230 (step A8 to step A11). For example, a lexical, "bit ::=OPENPR integer CLOSEPR" showing the BNF syntax rule to the BNF data "bit ::=OPENPR integer CLOSEPR" is outputted (step A10) and the action section is outputted. As the action section, the entry of the BNF data "bit ::=OPENPR integer CLOSEPR" is found from the BNF rule check table 330 and the code is outputted to mark "the check section" column to the found entry (Step A11). This action section is started when a syntax of the test input file 390 matching to the BNF syntax rule, "bit ::=OPENPR integer CLOSEPR", is given to the syntax coverage percentage measurement unit 300.

Fourth, the operation of the syntax coverage percentage measuring unit 300 will be described using a specific example.

The BNF rule check table storage section 360 carries out an initial setting operation of the BNF rule check table 330 based on the BNF rule check table program file 230 (step B2 of FIGS. 6 and 7). For example, a data entry of (n, bit ::=OPENPR integer CLOSEPR, " ") is added to the BNF rule check table 330.

The syntax coverage percentage measuring unit 300 inputs a test input file 390 after the above-mentioned initial setting operation and the initial setting operation of the syntax analyzing section 320 (Step B3). For example, it is supposed that there is a line, "LENGTH 4 (3);", in the test input file 390. "(3)" of this line matches to the BNF syntax rule "bit ::=OPENPR integer CLOSEPR".

At this time, the file reading section 310 reads "(3)" from the test input file 390 and divides it into tokens "(", "3" and ")". Here, "(" corresponds to "OPENPR", "3" corresponds to "integer" and ")" corresponds to "CLOSEPR".

The syntax analyzing section 320 carries out the following syntax analyzing in the syntax analyzing section program file 230 read at the step B1 (step B5), and recognizes that the above-mentioned token sequence matches to the BNF syntax rule, "bit::=OPENPR integer CLOSEPR". Thus, an action section is carried out to the BNF syntax rule. The action section marks "the check section" column of the entry (n, bit OPENPR integer CLOSEPR, " ") in the BNF rule check table 330 through the BNF rule check table storage section 360, and (n, bit ::=OPENPR integer CLOSEPR, "OK") is set (step B6 and step B7). It should be noted that it is supposed that "OK" indicates the check.

After the syntax analyzing section 320 completes the syntax analysis to all the test input files 390, the covering percentage output section 340 accesses the BNF data and the existence or non-existence of the check of each entry of the BNF rule check table 330 in order of the BNF number from one through the BNF rule check table storage section 360 (Step B9).

Also, every time accessing the BNF data, the coverage percentage output section 340 increases the BNF data counter 370 by one (step B11). Then, the coverage percentage output section 340 carries out the following items a to h.

a) When accessing the BNF number n in the BNF rule check table 330, the coverage percentage output section 340 gets the entry (n, bit ::=OPENPR integer CLOSEPR, "OK").

b) Then, because the OR flag is "false", the coverage percentage output section 340 outputs the left side expression "bit" of the BNF data to the CRT 400 through the CRT output section 350 (step B12).

c) Also, because "the check section" column of the entry (n, bit OPENPR integer CLOSEPR, "OK") has been marked, the coverage percentage output section 340 increases the value of check counter 380 by one (Step B14).

d) Moreover, the coverage percentage output section 340 outputs the mark of "*" indicating to be already marked, to the CRT 400 through the CRT output section 350 (step B15).

e) The coverage percentage output section 340 outputs the right side equation, "OPENPR integer CLOSEPR", to the CRT 400 through the output section 350 (Step B16). It should be noted that ";" is not outputted because the semicolon flag is "false".

f) When accessing the BNF number of (n+1) subsequently to the above-mentioned BNF number of n, the coverage percentage output section 340 obtains the entry (n+1, bit ::=OPENPR integer CLOSEPR, " ").

g) Then, because the OR flag is "true", the coverage percentage output section 340 outputs "|" to the CRT 400 through the CRT output section 350 (Step B12). At this time, because there is not a check in "the check section" column, the coverage percentage output section 340 does not carry out the increase of the value of check counter 380 and the output of mark "*".

h) Also, because the semicolon flag is "true", the coverage percentage output section 340 outputs the right side equation ";" to the CRT 400 through the CRT output section 350 (Step B16).

As mentioned above, when the accessing operation to all the BNF data is completed, the coverage percentage output section 340 divides the value of check counter 380 by the value of the BNF data counter 370 to calculate the coverage percentage (step B17) and outputs the calculated coverage percentage to the CRT 400 through the CRT output section 350 (step B18).

[The Second Embodiment]

Figure 16:
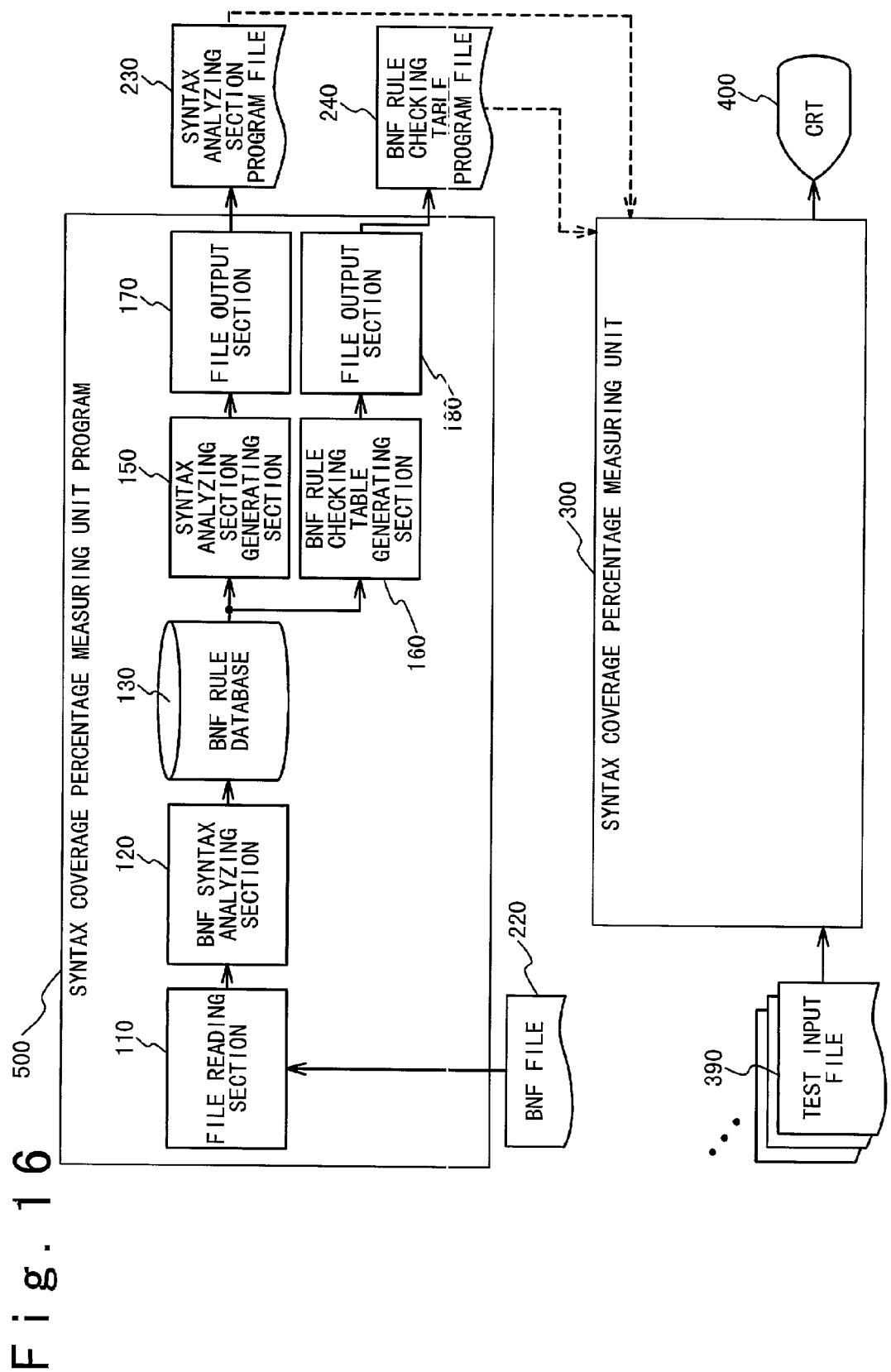
FIG. 16 is a block diagram showing the structure of the syntax coverage percentage measuring system according to a second embodiment of the present invention.

FIG. 16 is a block diagram showing the structure of the syntax coverage percentage measuring system according to the second embodiment of the present invention.

Referring to FIG. 16, the syntax coverage percentage measuring system in accordance with this embodiment is composed of a syntax coverage percentage measuring unit program generating unit 500, the syntax coverage percentage measuring unit 300, the BNF file 220, the syntax analyzing section program file 230, the BNF rule check table program file 240, test input files 390, and the CRT 400.

The syntax coverage percentage measuring unit program generating unit 500 is composed of the file reading section 110, the BNF the syntax analyzing section 120, the BNF rule database 130, the syntax analyzing section generating section 150, the BNF rule check table generating section 160, file output section 170, and the file output section 180. It should be noted that the components other than the syntax coverage percentage measuring unit program generating unit 500 are same as those in the syntax coverage percentage measuring system in accordance with the first embodiment.

Referring to FIG. 16, the syntax coverage percentage measuring unit program generating unit 500 of the second embodiment of the present invention is different from the syntax coverage percentage measuring unit program generating unit 100 of the first embodiment in FIG. 4 in the point that the BNF semantic testing unit 140, the file name storage section 190, the line number counter 200 and the display section 210 are omitted.

Figure 17:
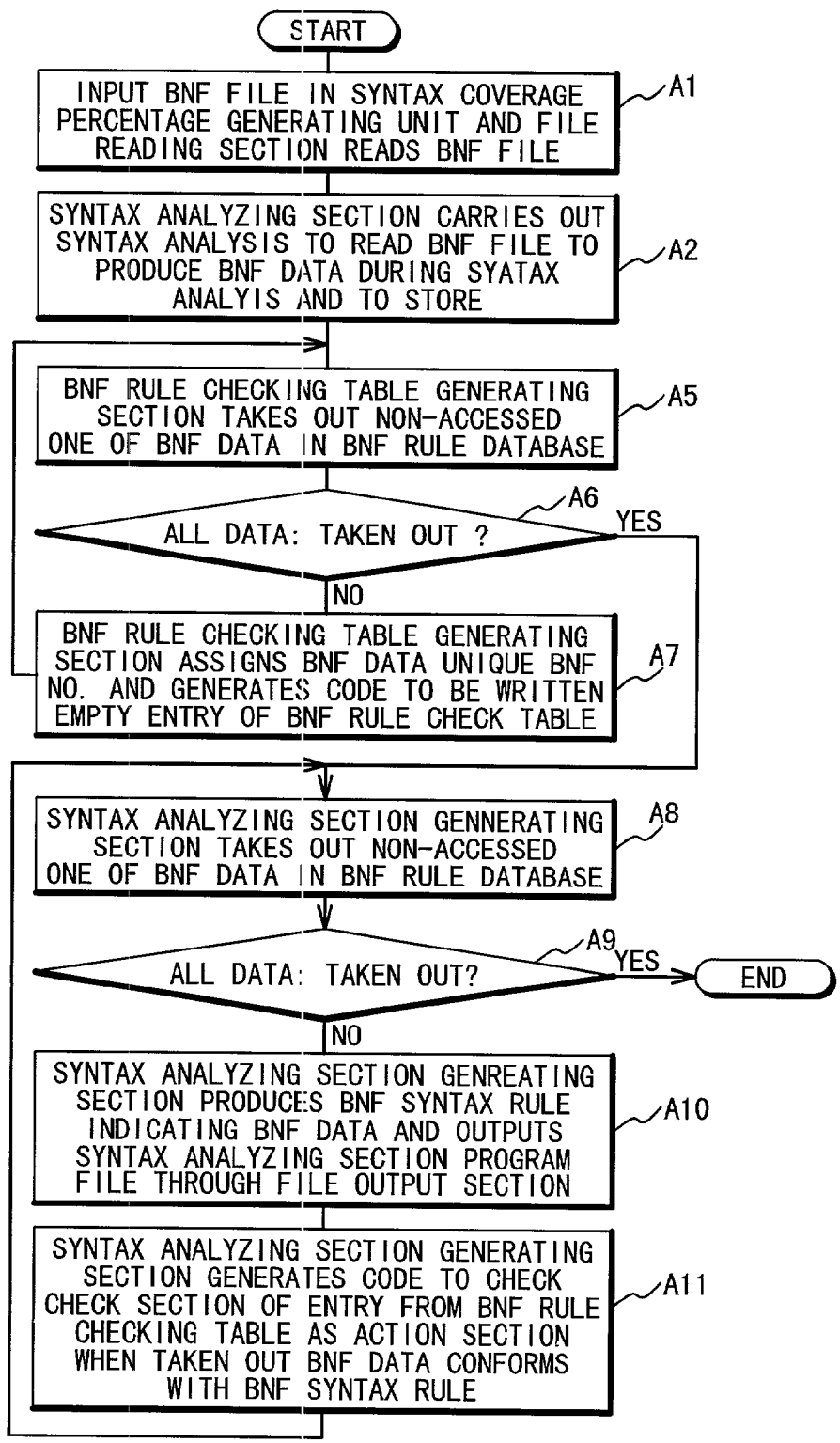
FIG. 17 is a flow chart showing the operation of the syntax coverage percentage measuring unit program generating unit in FIG. 16.

FIG. 17 is a flow chart showing the process operation of the syntax coverage percentage measuring unit program generating unit 500 in FIG. 16. This process is composed of a BNF file reading step A1, a BNF data origination step A2, a BNF data taking-out step A5, an entire BNF data taking-out end determining step A6, a BNF rule check table program code generation step A7, a BNF data taking-out step A8, an entire BNF data taking-out end determining step A9, a BNF syntax rule producing and outputting step A10, and an action section generating step A11.

Next, the whole operation of the syntax coverage percentage measuring system in accordance with this embodiment will be described with reference to FIG. 16 and FIG. 17. The operations at the steps A1, A2 and A5 to A11 in FIG. 17 in this embodiment are same as those of the steps A1, A2 and A5 to A11 in FIG. 5 in the first embodiment. Therefore, these operations will not be described. In the first embodiment, the semantic test is carried out by the BNF semantic testing unit 140 after process of the step A2. On the other hand, the semantic test by the BNF semantic testing unit 140 after process of the step A2 is not carried out in this embodiment and the control flow advances to the process of the step A5.

Next, the effect of the syntax coverage percentage measuring system in accordance with this embodiment will be described. Because the BNF semantic testing unit 140 is omitted in this embodiment, the program can be generated at higher speed to realize the syntax coverage percentage measurement unit 300 without the process of the semantic test.

It should be noted that the BNF file 220 is used for the development of the language processing system as the test object and it is guaranteed that the BNF file 220 is right in semantic. Therefore, the probability that any problem does not occur is high even if the semantic test process of the BNF file 220 is omitted like this embodiment, as far as the same file as the BNF file used for the development of the language processing system is used as the BNF file 220.

[The Third Embodiment]

Figure 18:
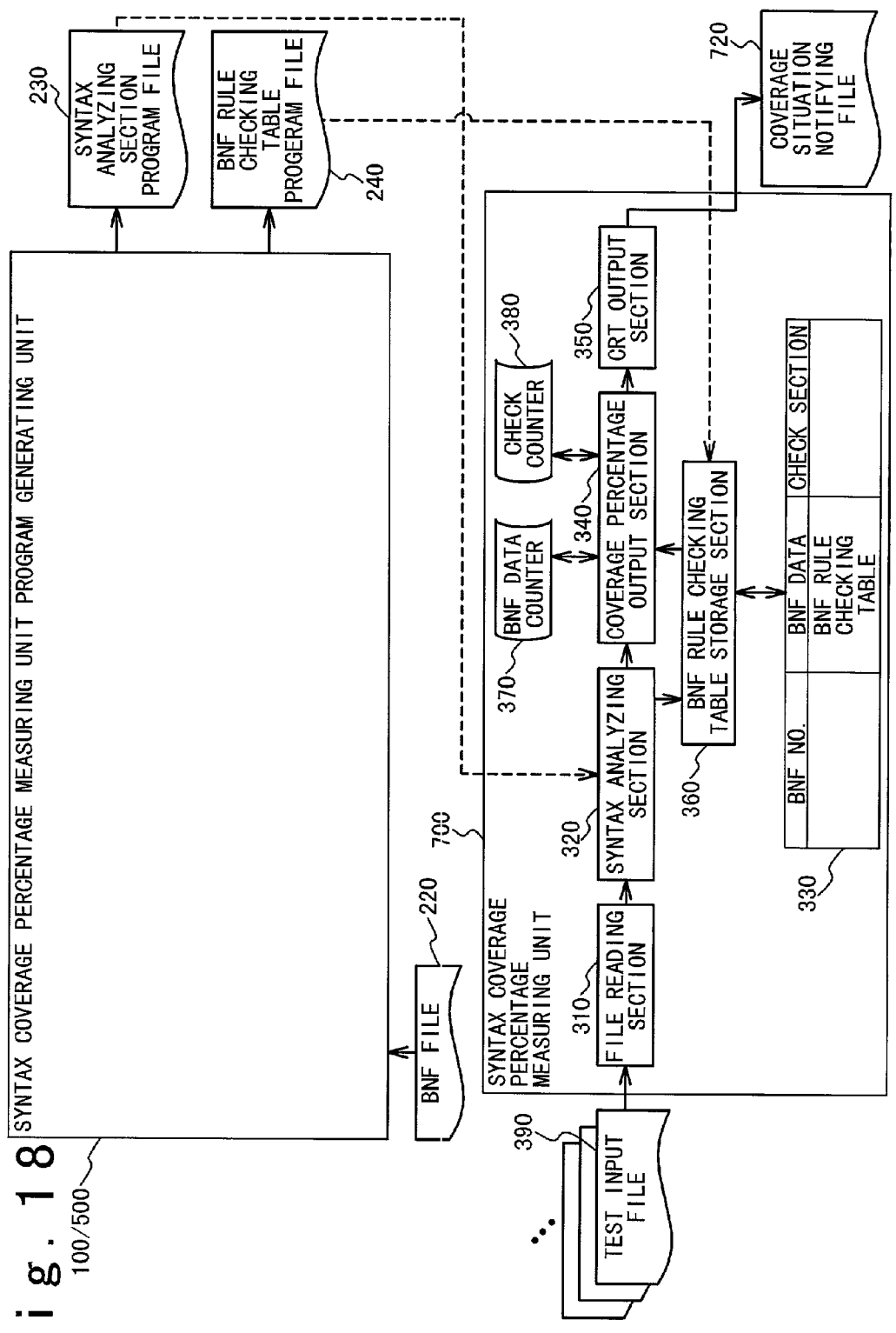
FIG. 18 is a block diagram showing the structure of the syntax coverage percentage measuring system according to a third embodiment of the present invention.

FIG. 18 is a block diagram showing the structure of the syntax coverage percentage measuring system according to the third embodiment of the present invention.

Referring to FIG. 18, the syntax coverage percentage measuring system in accordance with this embodiment is composed of the syntax coverage percentage measuring unit program generating unit 100/500 (this means that the syntax the coverage percentage measuring unit program generating unit 100 in FIG. 4 may be used or the syntax coverage percentage measuring unit program generating unit 500 in FIG. 16 may be used), the syntax coverage percentage measuring unit 700, the BNF file 220, the syntax analyzing section program file 230, the BNF rule check table program, file 240, test input files 390, and the coverage situation report file 720.

The syntax coverage percentage measuring unit 700 is composed of the file reading section 310, the syntax analyzing section 320, the BNF rule check table 330, the coverage percentage output section 340, the BNF rule check table storage section 360, the BNF data counter 370, the check counter 380, and the file output section 710. It should be noted that the components other than the syntax coverage percentage measuring unit 700 and the coverage situation report file 720 are same as those of the syntax coverage percentage measuring system in accordance with the first and second embodiments.

Referring to FIG. 18, the third embodiment of the present invention is different from the first or second embodiment in the point that the file output section 710 and the coverage situation report file 720 in the syntax coverage percentage measuring unit 700 are provided, instead of the CRT output section 350 and the CRT 400 in the syntax coverage percentage measuring unit 300 of the first and second embodiments.

The file output section 710 receives the coverage percentage, and the BNF syntax rule and the mark of the coverage position as the data indicating the coverage situation generated by the coverage percentage output section 340 in the form of the lexical. Then, the file output section 710 outputs the measurement result by the syntax coverage percentage measurement unit 700) as a coverage situation report file 720. The Covering situation report file 720 is a file having as the contents the measurement result by the syntax coverage percentage measurement unit 700.

Figure 19:
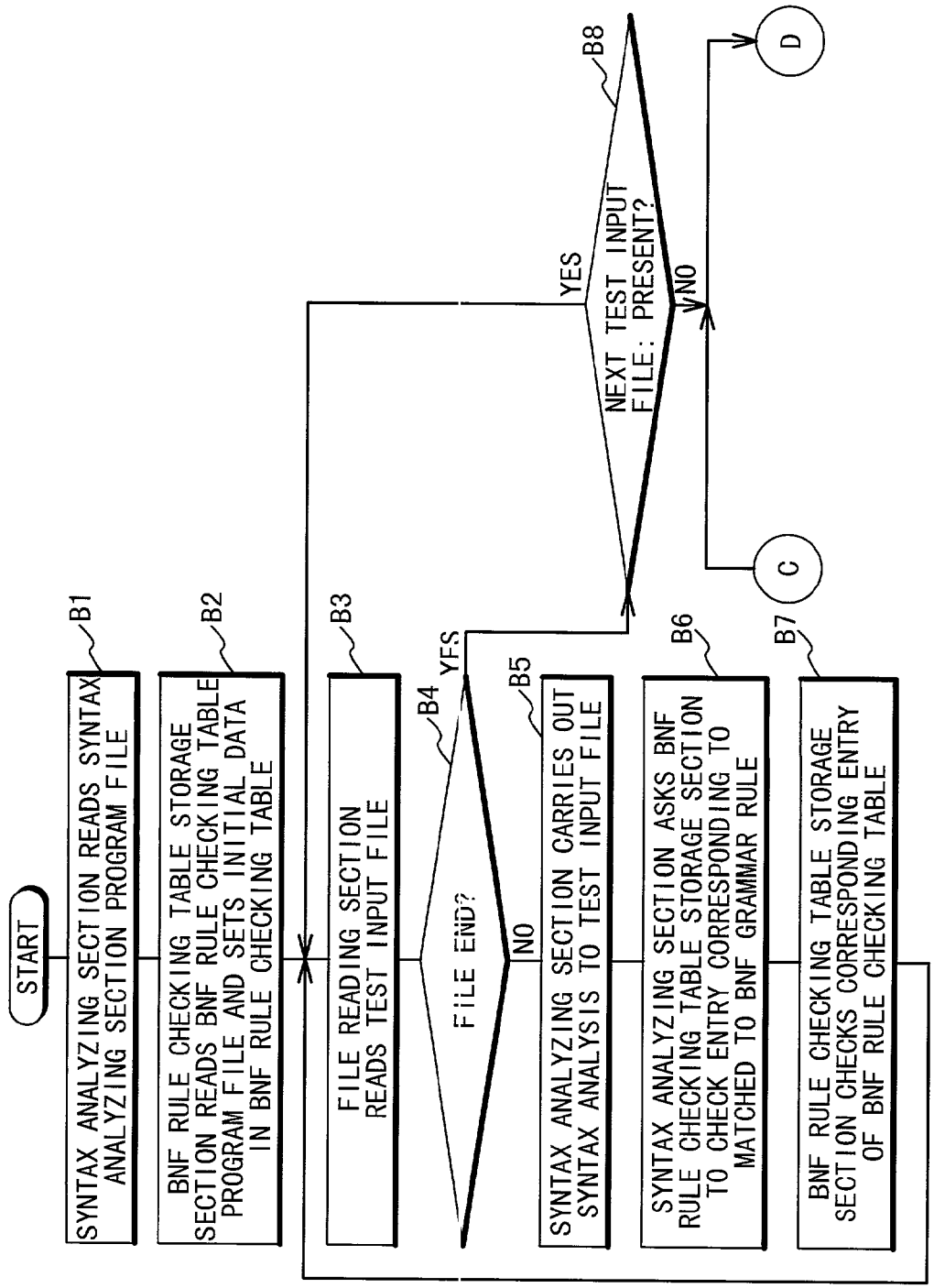
FIGS. 19 and 20 are a flow chart showing the operation of the syntax coverage percentage measuring unit in FIG. 18.
Figure 20:
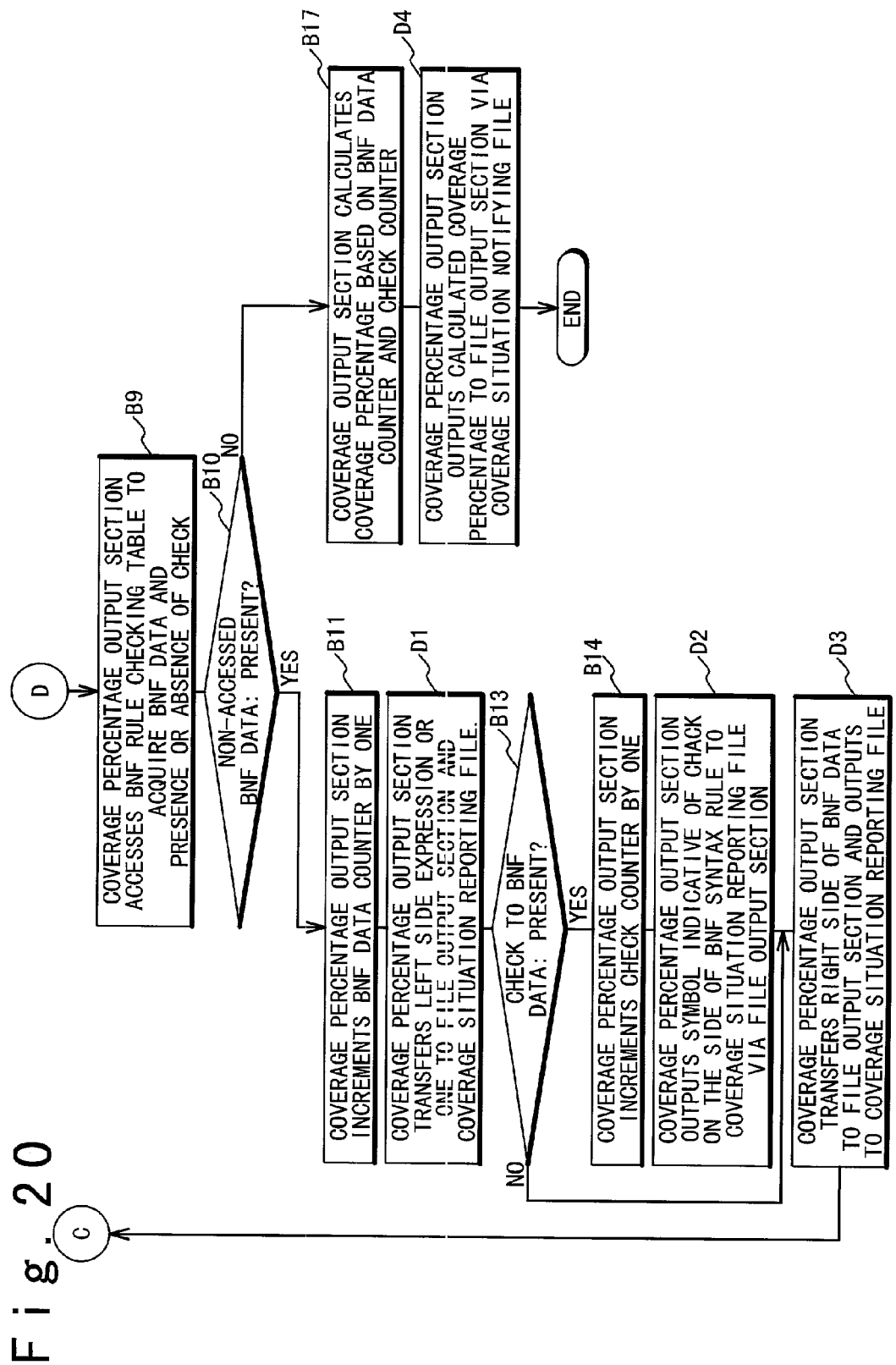

FIGS. 19 and 20 are a flow chart showing the process of the syntax coverage percentage measuring unit 700 in FIG. 18. The process is composed of the syntax analyzing section program file reading step B1, the BNF rule check table program file reading step B2, the test input file reading step B3, the file end determining step B4, the test input file syntax analyzing step B5, the BNF rule check table checking request step B6, the BNF rule check table checking step B7, the next test input file existence determining step B8, the BNF rule check table access step B9, an un-accessed BNF data existence determining step B10, the BNF data counter increase step B11, a BNF data left side expression coverage situation report file output step D1, the BNF data compatible checking existence or non-existence determining step B13, the check counter increasing step B14, a check display mark coverage situation report file output step D2, a BNF data right side coverage situation report file output step D3, the coverage percentage calculating step B17 and a coverage percentage coverage situation report file output step D4.

Next, the whole operation of the syntax coverage percentage measuring system in accordance with this embodiment will be described with reference to FIG. 18 and FIGS. 19 and 20. The operations of this embodiment shown in the steps B1 to B11, B13, B14 and B17 in FIGS. 19 and 20 are same as those of the first embodiment shown in the steps B1 to B11, B13, B14 and B17 in FIGS. 6 and 7. Therefore, the description of these operations will be omitted.

Here, in the following items a to d, the operations of the syntax coverage percentage measuring system peculiar to the syntax coverage percentage measuring unit 700 in accordance with this embodiment will be described below. The operation is different from that of the syntax coverage percentage measuring unit 300 of the first and embodiments.

a) The coverage percentage output section 340 displays the lexical or lexical "l" showing the left side expression of the BNF data to the CRT 400 through the CRT output section 350 in accordance with the OR flag at the step B12 in the first and second embodiments. On the other hand, in this embodiment, the coverage percentage output section 340 outputs the lexical or lexical "l" showing the left side expression of the BNF data to the coverage situation report file 720 through the file output section 710 in accordance with the OR flag (step D1 of FIGS. 19 and 20).

b) The coverage percentage output section 340 displays the mark showing check at the side of the BNF syntax rule on the CRT 400 through the CRT output section 350 at the step B15 in the first and second embodiments. On the other hand, in this embodiment, the coverage percentage output section 340 outputs the mark showing check at the side of the BNF syntax rule to the coverage situation report file 720 through the file output section 710 (step D2).

c) The coverage percentage output section 340 transfers the right side of the BNF data to the CRT output section 350 at the step B16 in the first and second embodiments and displays it on the CRT 400. On the other hand, in this embodiment, the coverage percentage output section 340 transfers the lexical showing the right side of the BNF data to the file output section 710 and outputs it to the coverage situation report file 720 (step D3).

d) The coverage percentage output section 340 displays the coverage percentage on the CRT 400 through the CRT output section 350 at the step B18 in the first and second embodiments. On the other hand, at this embodiment, the coverage percentage output section 340 outputs the coverage percentage to the coverage situation report file 720 through the file output section 710 (step D4).

Next, a specific operation of the syntax coverage percentage measuring system in accordance with this embodiment will be described. For example, it is supposed that the BNF syntax rule, "attributes ::=attribute SEMICOLON attributes", is the BNF syntax rule for the BNF data in which "the check section" column has been marked, i.e., a covered BNF syntax rule.

The coverage percentage output section 340 transfers the lexical "attributes" showing the left side expression of the BNF data to the file output section 710 and outputs the data showing the coverage situation about the BNF syntax rules to the coverage situation report file 720 (step D1). Here, the BNF syntax rule is already checked. Therefore, the control flow advances to the process of the step B14 and the step D2 (step B1:).

The coverage percentage output section 340 increases the check counter by one (Step B14). Then, the coverage percentage output section 340 transfers the lexical "*" showing that the BNF data is covered, to the file output section 710 and outputs the lexical to the coverage situation report file 720 (step D2).

Moreover, the coverage percentage output section 340 transfers the lexical "attribute SEMICOLON attributes" showing the right side of the BNF data to the file output section 710 and outputs it to the coverage situation report file 720 (step D3).

Lastly, the step D4 about the display of the coverage percentage will be described. It is supposed that the coverage percentage is 34%, when the coverage percentage is calculated at the step B17. At this time, the coverage percentage output section 340 outputs a lexical of "34%" to the coverage situation report file 720 through the file output section 710 (step D4).

Next, the effect peculiar to the syntax coverage percentage measuring system in accordance with this embodiment will be described.

As shown by the output examples of FIGS. 12 to 14 of the syntax coverage percentage measuring unit, the data about the report of the coverage situation becomes longer. Therefore, it is easy for the user to detect the non-the coverage portion by storing data in the coverage situation report file 720 like this embodiment. That is, it is helpful to the user to access a file through a text editor, for the purpose of the coverage a non-coverage portion.

(4) A Modification of the First Embodiment or the Second Embodiment

The modification is possible in which the CRT 400 is replaced by another output unit in the syntax coverage percentage measuring system in accordance with the above-mentioned first and second embodiments. For example, as the other output unit, a printer is thought of. In this case, the CRT output section 350 is substituted for the output section in accordance with the calculated outputs such as the printer output section.

[The Fourth Embodiment]

Figure 21:
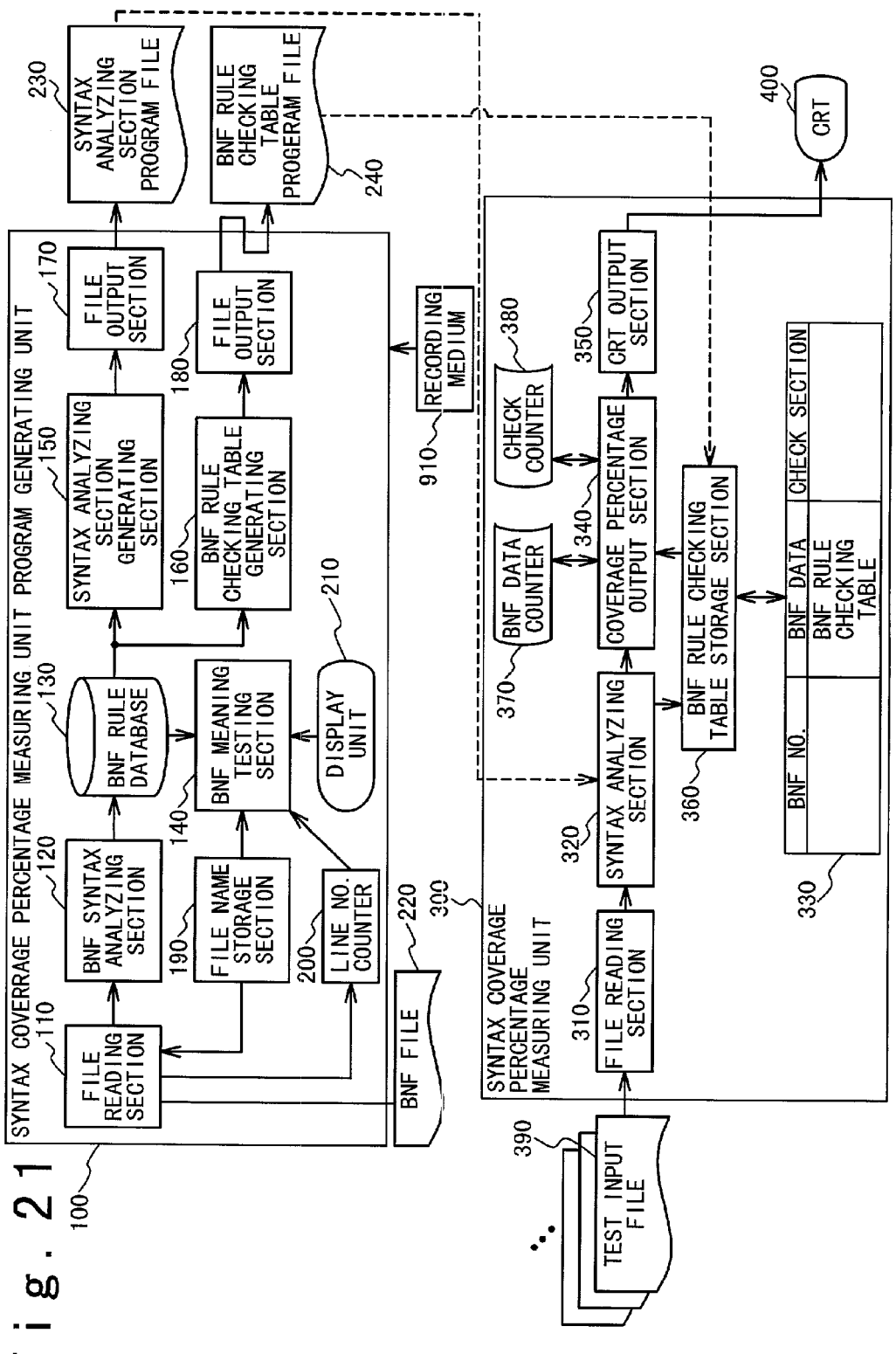
FIG. 21 is a block diagram showing the structure of the syntax coverage percentage measuring system according to a fourth embodiment of the present invention.

FIG. 21 is a block diagram showing the structure of the syntax coverage percentage measuring system according to the fourth embodiment of the present invention.

Referring to FIG. 21, the syntax coverage percentage measuring system in accordance with the fourth embodiment of the present invention is different from the syntax coverage percentage measuring system in accordance with the first embodiment shown in FIG. 4 in the following point. That is, a recording medium 910 is provided in which the syntax coverage percentage measuring unit program generating unit program is recorded. This recording medium 910 may be a magnetic disk, a semiconductor memory, or another recording medium.

The syntax coverage percentage measuring unit program generating unit program is read from the recording medium 910 to the syntax coverage percentage measuring unit program generating unit 100. Thus, the operation of the syntax coverage percentage measuring unit program generating unit 100 is controlled as the file reading section 110, the BNF syntax analyzing section 120, the BNF rule database 130, the BNF semantic testing unit 14D, the syntax analyzing section generating section 150, the BNF rule check table generating section 160, the file output section 170, the file output section 180, the file name storage section 190, the line number counter 200 and display section 210. The operation of the syntax coverage percentage measuring unit program generating unit 100 under the control of the syntax coverage percentage measuring unit program generating unit program is the same as that of the syntax coverage percentage measuring unit program generating unit 100 in the first embodiment. Therefore, the detailed description is omitted.

[The Fifth Embodiment]

Figure 22:
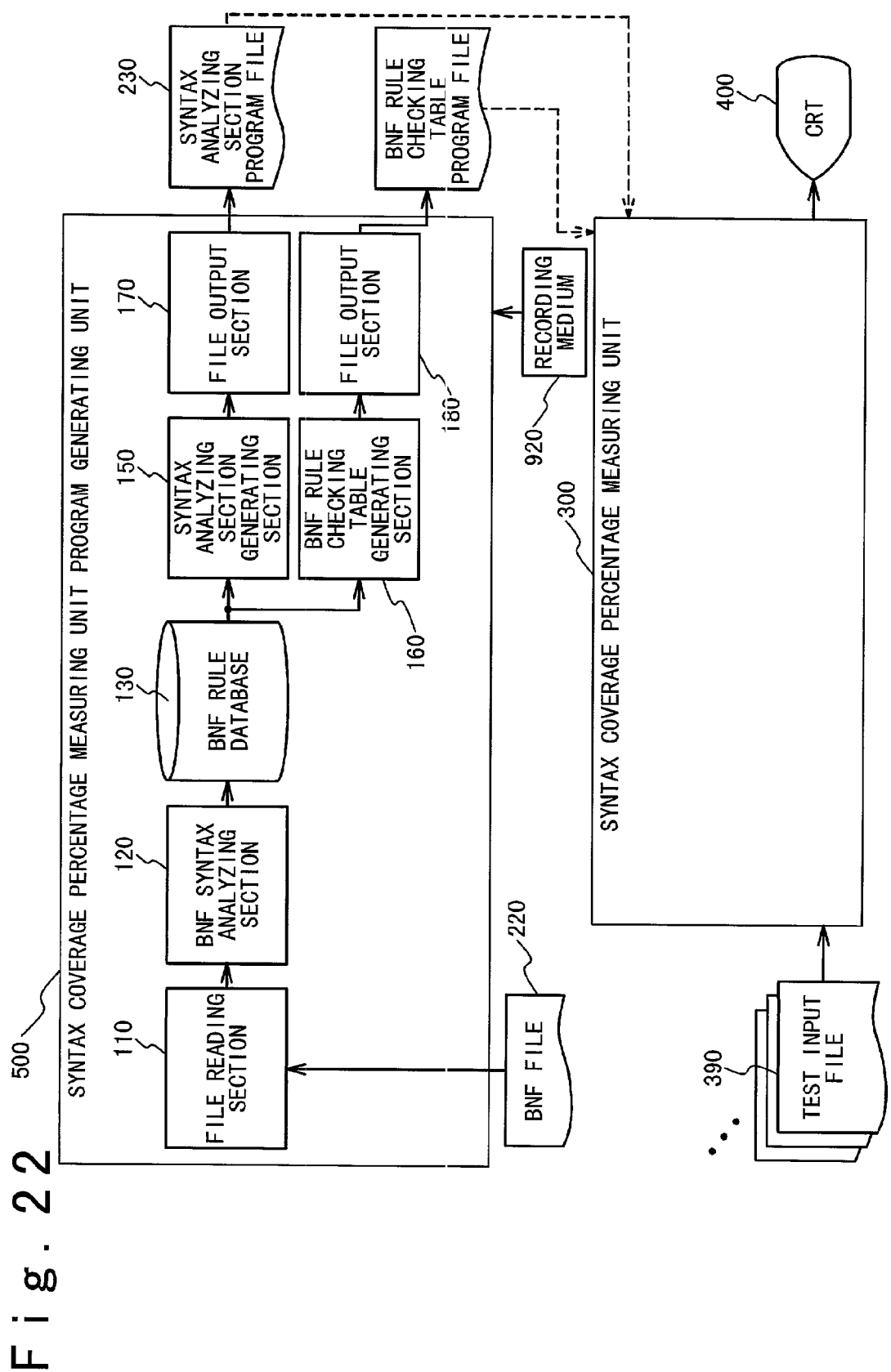
FIG. 22 is a block diagram showing the structure of the syntax coverage percentage measuring system according to a fifth embodiment of the present invention.

FIG. 22 is a block diagram showing the structure of the syntax coverage percentage measuring system in accordance with the fifth embodiment of the present invention.

Referring to FIG. 22, the syntax coverage percentage measuring system in accordance with the fifth embodiment of the present invention is different from the syntax coverage percentage measuring system in accordance with the second embodiment shown in FIG. 16 in the following point. That is, a recording medium 920 is provided in which the syntax coverage percentage measuring unit program generating unit program is recorded. The recording medium 920 may be a magnetic disk, a semiconductor memory, or another recording medium.

The syntax coverage percentage measuring unit program generating unit program is read by the syntax coverage percentage measuring unit program generating unit 500 from the recording medium 920. The operation of the syntax coverage percentage measuring unit program generating unit 500 is controlled as the file reading section 110, the BNF syntax analyzing section 120, the BNF rule database 130, the syntax analyzing section generating section 150, the BNF rule check table generating section 160, the file output section 170, and the file output section 180. The operation of the syntax coverage percentage measuring unit program generating unit 500 under the control of the syntax coverage percentage measuring unit program generating unit program is the same as that of the syntax coverage percentage measuring unit program generating unit 500 in the second embodiment. Therefore, the detailed description is omitted.

[The Sixth Embodiment]

FIG. 23 is a block diagram showing the structure of the syntax coverage percentage measuring system according to the sixth embodiment of the present invention.

Referring to FIG. 23, the syntax coverage percentage measuring system in accordance with the sixth embodiment of the present invention is different from the syntax coverage percentage measuring system in accordance with the third embodiment shown in FIG. 18 in the following point. That is, a recording medium 930 is provided in which the syntax coverage percentage measuring unit program generating unit program is stored. The recording medium 930 may be a magnetic disk, a semiconductor memory, or another recording medium.

The syntax coverage percentage measuring unit program generating unit program is read from the recording medium 930 to the syntax coverage percentage measuring unit program generating unit 100/500, i.e., the syntax coverage percentage measuring unit program generating unit 500 shown in FIG. 21 or the syntax coverage percentage measuring unit program generating unit 100 shown in FIG. 22. The operation of the syntax coverage percentage measuring unit program generating unit 100/500 is controlled as "the file reading section 110, the BNF syntax analyzing section 120, the BNF rule database 130, the BNF semantic testing unit 140, the syntax analyzing section generating section 150, the BNF rule check table generating section 160, the file output section 170, the file output section 180, the file name storage section 190, the line number counter 200 and the display section 210" or "the file reading section 110, the BNF syntax analyzing section 120, the BNF rule database 130, the syntax analyzing section generating section 150, the BNF rule check table generating section 160, the file output section 170 and the file output section 180". The operation of the syntax coverage percentage measuring unit program generating unit 100/500 under the control of the syntax coverage percentage measuring unit program generating unit program is the same as that of the syntax coverage percentage measuring unit program generating unit 100/500 in the third embodiment. Therefore, the detailed description will be omitted.

As described above, in accordance with the present invention, the syntax coverage percentage measuring unit can be generated, using the BNF file and the character and word analysis file developed for the language processing system as the test object just as they are. Using the syntax coverage percentage measuring unit generated in this way, the quantity and the validity of the quality of the test input files can be known. Also, what BNF syntax rule should be added can be known by examining the uncovered BNF syntax rule.

Also, the reduction of the test process can be achieved because the syntax coverage percentage measuring unit can be automatically generated using the existing files. The reason why the syntax coverage percentage measuring unit can be automatically generated is that the syntax analyzing section generating section and the BNF rule check table generating section generate the syntax analyzing section program file and the BNF rule check table program file matching to the syntax rules accepted by the language processing system as the test object based on the BNF files.

What is claimed is:

1. A syntax coverage percentage measuring system for testing development of a language processing system, said percentage measuring system comprising:
   a BNF (Backus Normal (Naur) Form) rule check table which has BNF data respectively corresponding to BNF syntax rules;
   a first file reading section which reads each of test input files and carries out lexical analysis to data of each of the read test input files to classify into tokens;
   a first syntax analyzing section which carries out syntax analysis to each of said tokens, and marks one of said BNF data of said BNF rule check table corresponding to said token;
   a coverage percentage output section which acquires a total number of said BNF data and a number of said marked BNF data from said BNF rule check table, and calculates a coverage percentage based on the total number of said BNF data and the number of said marked BNF data; and
   an output section which outputs said coverage percentage calculated by said coverage percentage output section.

2. The syntax coverage percentage measuring system according to claim 1, wherein said output section includes a display unit, and
   said display unit displays said coverage percentage.

3. The syntax coverage percentage measuring system according to claim 1, wherein said coverage percentage output section retrieves said marked BNF data,
   said output section includes a display unit, and
   said display unit displays said marked BNF data in addition to said coverage percentage.

4. The syntax coverage percentage measuring system according to claim 1, wherein said output section includes a storage unit having a reporting file, and
   said output section stores said coverage percentage in said reporting file.

5. The syntax coverage percentage measuring system according to claim 1, wherein said coverage percentage output section retrieves said marked BNF data,
   said output section includes a storage unit having a reporting file, and
   said output section stores said marked BNF data in addition to said coverage percentage in said reporting file.

6. The syntax coverage percentage measuring system according to claim 1, wherein said syntax analyzing section operates based on a syntax analysis program which is generated based on a BNF file in which said BNF syntax rules are described.

7. The syntax coverage percentage measuring system according to claim 1, wherein said BNF rule check table is generated based on a BNF rule check table program which is generated based on a BNF file in which said BNF syntax rules are described.

8. A syntax coverage percentage measuring system for testing development of a language processing system, said percentage measuring system comprising:
   a syntax coverage percentage measuring unit program generating unit which generates a syntax analyzing section program and a BNF rule check table program from a BNF file in which BNF syntax rules are described; and
   a syntax coverage percentage measuring unit which reads said syntax analyzing section program and said BNF rule check table program generated by said syntax coverage percentage measuring unit program generating unit, tests data of each of test input files based on said syntax analyzing section program using said BNF rule check table program, and generates said syntax coverage percentage for each of said test input files based on a test result.

9. The syntax coverage percentage measuring system according to claim 8, wherein said syntax coverage percentage measuring unit program generating unit has a BNF rule database, and reads said BNF file, carries out syntax analysis to said BNF rules of said BNF file to generate BNF data, stores said BNF data in said BNF rule database, and generates said syntax analyzing section program and said BNF rule check table program from said BNF data in said BNF rule database.

10. The syntax coverage percentage measuring system according to claim 8, wherein said syntax coverage percentage measuring unit tests each of test input files based on said syntax analyzing section program using said BNF rule check table program, and outputs a coverage situation of said BNF syntax rules and said coverage percentage for said test input files based on the test result.

11. The syntax coverage percentage measuring system according to claim 8, wherein said syntax coverage percentage measuring unit program generating unit comprises:
   a BNF rule database;
   a first file reading section which reads said BNF file and classifies data of said BNF file into tokens;
   a BNF syntax analyzing section which carries out syntax analysis to each of said tokens to generate BNF data based on said BNF syntax rules, and stores said BNF data in said BNF rule database;
   a syntax analyzing section generating section which generates said syntax analyzing section program from said BNF data stored in said BNF rule database;
   a BNF rule check table generating section which generates said BNF rule check table program from said BNF data stored in said BNF rule database.

12. The syntax coverage percentage measuring system according to claim 11, further comprising:
   a display unit; and
   a semantic test section carries out semantic analysis to said BNF data stored in said BNF rule database and controls said display unit to display an error message when a semantic discrepancy is found in said BNF data.

13. The syntax coverage percentage measuring system according to claim 11, wherein each of said BNF data has a BNF rule number and a check section, and
   said check section is marked by said syntax coverage percentage measuring unit.

14. The syntax coverage percentage measuring system according to claim 8, wherein said syntax coverage percentage measuring unit comprises:
   a BNF rule check table generated based on said BNF rule check table program and having said BNF data;
   a second file reading section which reads each of test input files and carries out lexical analysis to data of each of the read test input files to classify into tokens;
   a syntax analyzing section which carries out syntax analysis to each of said tokens, and marks one of said BNF data of said BNF rule check table corresponding to said token;
   a coverage percentage output section which is generated based on said syntax analyzing section program, and acquires a total number of said BNF data and a number of said marked BNF data from said BNF rule check table, and calculates a coverage percentage based on the total number of said BNF data and the number of said marked BNF data; and
   an output section which outputs said coverage percentage calculated by said coverage percentage output section.

15. The syntax coverage percentage measuring system according to claim 14, wherein said output section includes a display unit, and
   said display unit displays said coverage percentage.

16. The syntax coverage percentage measuring system according to claim 14, wherein said coverage percentage output section retrieves said marked BNF data,
   said output section includes a display unit, and
   said display unit displays said marked BNF data in addition to said coverage percentage.

17. The syntax coverage percentage measuring system according to claim 14, wherein said output section includes a storage unit having a reporting file, and
   said output section stores said coverage percentage in said reporting file.

18. The syntax coverage percentage measuring system according to claim 14, wherein said coverage percentage output section retrieves said marked BNF data,
   said output section includes a storage unit having a reporting file, and
   said output section stores said marked BNF data in addition to said coverage percentage in said reporting file.

19. The syntax coverage percentage measuring system according to claim 14, wherein said syntax analyzing section operates based on a syntax analysis program which is generated based on a BNF file in which said BNF syntax rules are described.

20. The syntax coverage percentage measuring system according to claim 14, wherein said BNF rule check table is generated based on a BNF rule check table program which is generated based on a BNF file in which said BNF syntax rules are described.

21. A method of measuring a syntax coverage percentage for testing development of a language processing system, said method comprising the steps of:
   reading each of test input files to carry out lexical analysis to data of each of the read test input files to classify into tokens;
   carrying out syntax analysis to each of said tokens, to mark one of BNF data of a BNF rule check table corresponding to said token, said BNF rule check table having said BNF data respectively corresponding to BNF syntax rules;
   acquiring a total number of said BNF data and a number of said marked BNF data from said BNF rule check table;
   calculating a coverage percentage based on the total number of said BNF data and the number of said marked BNF data; and
   outputting said coverage percentage calculated by said coverage percentage output section.

22. The method according to claim 21, wherein said outputting step comprises the step of:
   displaying said coverage percentage on a display unit.

23. The method according to claim 21, wherein said outputting step comprises the step of:
   outputting said coverage percentage to store in said reporting file.

24. The method according to claim 21, wherein said step of carrying out syntax analysis is carried out based on a syntax analysis program which is generated based on a BNF file in which said BNF syntax rules are described.

25. The method according to claim 21, wherein said BNF rule check table is generated based on a BNF rule check table program which is generated based on a BNF file in which said BNF syntax rules are described.

26. A method of measuring a syntax coverage percentage for testing development of a language processing system, said method comprising the steps of:

generating a syntax analyzing section program and a BNF rule check table program from a BNF file in which BNF syntax rules are described;

reading said syntax analyzing section program and said BNF rule check table program generated by said syntax coverage percentage measuring unit program generating unit;

testing data of each of test input files based on said syntax analyzing section program using said BNF rule check table program; and generating said syntax coverage percentage for each of said test input files based on a test result.

27. The method according to claim 26, wherein said step of generating a syntax analyzing section program and a BNF rule check table program comprises the steps of:

reading said BNF file and classifies data of said BNF file into tokens;

carrying out syntax analysis to each of said tokens to generate BNF data based on said BNF syntax rules, and stores said BNF data in a BNF rule database;

generating said syntax analyzing section program from said BNF data stored in said BNF rule database;

generating said BNF rule check table program from said BNF data stored in said BNF rule database.

28. The method according to claim 27 further comprising the steps of:

carrying out semantic analysis to said BNF data stored in said BNF rule database; and controlling a display unit to display an error message when a semantic discrepancy is found in said BNF data.

* * * * *